United States Patent
Choi et al.

(10) Patent No.: US 11,362,778 B2
(45) Date of Patent: Jun. 14, 2022

(54) METHOD FOR RECEIVING CONTROL INFORMATION FOR SRS TRANSMISSION IN WIRELESS COMMUNICATION SYSTEM, AND USER EQUIPMENT THEREFOR

(71) Applicant: LG Electronics Inc., Seoul (KR)

(72) Inventors: Kukheon Choi, Seoul (KR); Jiwon Kang, Seoul (KR); Kyuseok Kim, Seoul (KR); Minki Ahn, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 267 days.

(21) Appl. No.: 16/496,351

(22) PCT Filed: Jan. 30, 2018

(86) PCT No.: PCT/KR2018/001273
§ 371 (c)(1),
(2) Date: Sep. 20, 2019

(87) PCT Pub. No.: WO2017/174401
PCT Pub. Date: Sep. 27, 2018

(65) Prior Publication Data
US 2020/0036493 A1 Jan. 30, 2020

Related U.S. Application Data

(60) Provisional application No. 62/479,281, filed on Mar. 30, 2017, provisional application No. 62/474,620, filed on Mar. 22, 2017.

(51) Int. Cl.
*H04L 5/00* (2006.01)
*H04L 27/26* (2006.01)
(Continued)

(52) U.S. Cl.
CPC .......... *H04L 5/0048* (2013.01); *H04L 27/262* (2013.01); *H04W 72/042* (2013.01); *H04W 74/0833* (2013.01); *H04L 27/2613* (2013.01)

(58) Field of Classification Search
CPC . H04L 5/0048; H04L 27/262; H04L 27/2613; H04W 72/042; H04W 74/0833
See application file for complete search history.

(56) References Cited

U.S. PATENT DOCUMENTS 9,344,917 B2    5/2016   Zhou et al.
9,560,646 B2 *  1/2017   Nishio ................. H04L 5/0023
(Continued)

FOREIGN PATENT DOCUMENTS

CN    102577522    7/2012
CN    105553633    5/2016
(Continued)

OTHER PUBLICATIONS

International Search Report and Written Opinion in PCT Application No. PCT/KR2018/001273, dated May 18, 2018, 25 pages (with English translation).

(Continued)

*Primary Examiner* — Walter J Divito
*Assistant Examiner* — Anthony Luo
(74) *Attorney, Agent, or Firm* — Fish & Richardson P.C.

(57) ABSTRACT

A method for a user equipment to receive control information for a sounding reference symbol (SRS) transmission in a wireless communication system may comprise: a step of receiving, from a base station, any one piece of information on an SRS bandwidth (BW), the number of SRS blocks and the length of an SRS block which have been set up for the user equipment; and a step of transmitting an SRS on the basis of the control information.

17 Claims, 18 Drawing Sheets

(51) Int. Cl.
*H04W 72/04* (2009.01)
*H04W 74/08* (2009.01)

(56) References Cited

U.S. PATENT DOCUMENTS

| | | | | |
|---|---|---|---|---|
| 2007/0237117 | A1* | 10/2007 | Moon | H04W 74/0866 |
| | | | | 370/335 |
| 2011/0116436 | A1* | 5/2011 | Bachu | H04L 5/0048 |
| | | | | 370/312 |
| 2012/0106489 | A1* | 5/2012 | Konishi | H04W 72/048 |
| | | | | 370/329 |
| 2012/0113967 | A1 | 5/2012 | Smith et al. | |
| 2018/0083752 | A1* | 3/2018 | Kim | H04W 72/0453 |
| 2019/0053205 | A1* | 2/2019 | Tomeba | H04L 5/005 |
| 2019/0081751 | A1* | 3/2019 | Miao | H04L 25/0224 |
| 2019/0182756 | A1* | 6/2019 | Wang | H04W 48/12 |
| 2019/0327685 | A1* | 10/2019 | Zhao | H04W 72/04 |

FOREIGN PATENT DOCUMENTS

| | | |
|---|---|---|
| KR | 10-1667264 | 10/2016 |
| WO | WO2017/027055 | 2/2017 |

OTHER PUBLICATIONS

EP extended European search report, in European Appln. No. 18770475.4, dated Nov. 27, 2020, 10 pages.
Qualcomm Incorporated, "Discussion on SRS Design," R1-1702618, 3GPP TSG RAN WG1 Meeting #88, Athens, Greece, dated Feb. 13-17, 2017, 11 pages.
ZTE, ZTE Microelectronics, "Discussion on SRS design for NR," Rl-1701818, 3GPP TSG RAN WG1 Meeting #88, Athens, Greece, dated Feb. 13-17, 2017, 3 pages.
Office Action in Chinese Appln. No. 201880020334.1, dated Nov. 3, 2021, 15 pages (with English translation).

* cited by examiner frequency

FIG. 8
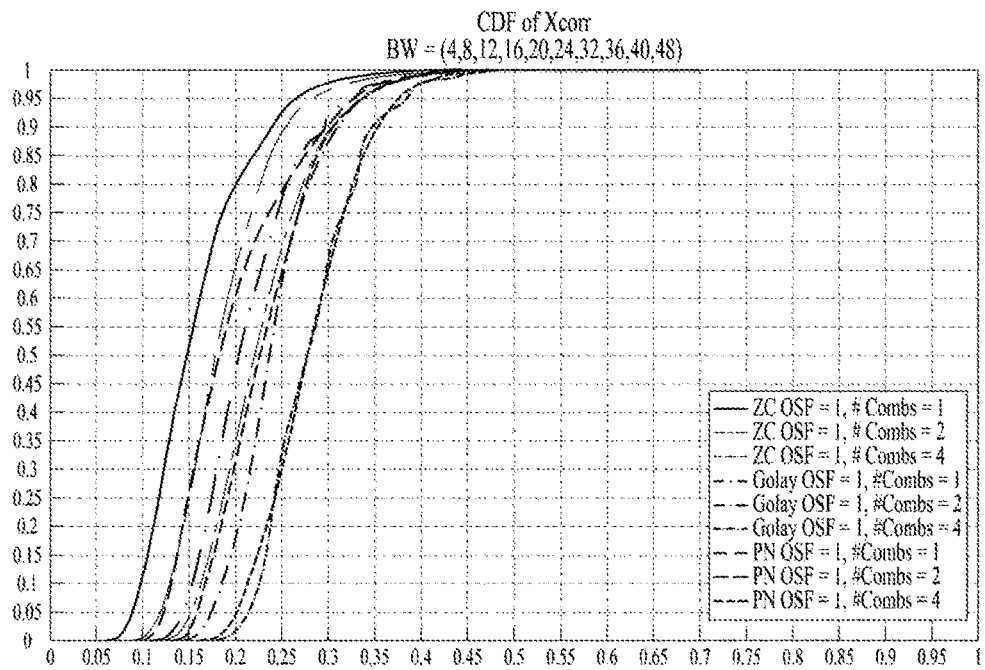
(a) Cross-correlation evaluation
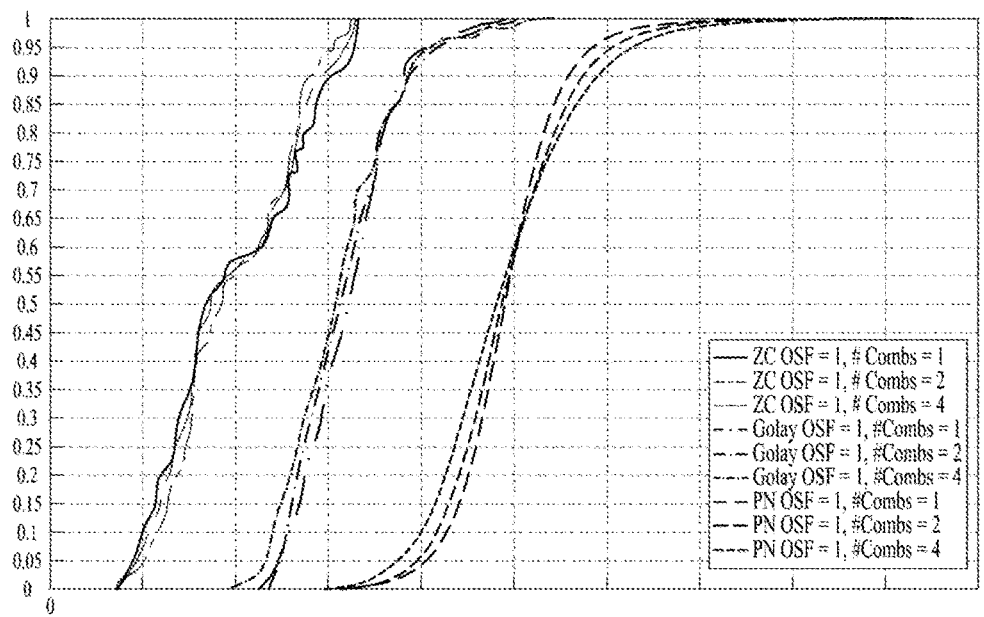
(b) cubic-Metric evaluation

| $X_1(k)e^{j\frac{2\pi m_1}{M_1}k}$ | $X_2(k)e^{j\frac{2\pi m_2}{M_1}k}$ | $\cdots$ | $X_{M_1}(k)e^{j\frac{2\pi M_1}{M_1}k}$ | $X_1(k)$ | ZC sequence | $n_i \in \{0, 1, ..., M_1-1\}$ |

SRS BW dependent PAPR (block length=4RB, TC=4)

METHOD FOR RECEIVING CONTROL INFORMATION FOR SRS TRANSMISSION IN WIRELESS COMMUNICATION SYSTEM, AND USER EQUIPMENT THEREFOR

CROSS-REFERENCE TO RELATED APPLICATIONS

This application is a National Stage application under 35 U.S.C. § 371 of International Application No. PCT/KR2018/001273, filed on Jan. 30, 2018, which claims the benefit of U.S. Provisional Application No. 62/479,281, filed on Mar. 30, 2017, and U.S. Provisional Application No. 62/474,620, filed on Mar. 22, 2017. The disclosures of the prior applications are incorporated by reference in their entirety.

TECHNICAL FIELD

The present disclosure relates to a wireless communication system and, more particularly, to a method of receiving control information for sounding reference symbol (SRS) transmission in a wireless communication system and a user equipment (UE) therefor.

BACKGROUND

With the introduction of a new radio access technology (RAT) system, as more and more communication devices require greater communication capacity, there is a need for mobile broadband communication enhanced over conventional Radio Access Technology (RAT).

In addition, massive Machine Type Communications (MTC) capable of providing a variety of services anywhere and anytime by connecting multiple devices and objects is one of important issues to be considered in the next-generation communications. Communication system design considering services/UEs sensitive to reliability and latency is also under discussion. Thus, the new RAT is to provide services considering enhanced Mobile Broadband (eMBB) communication, massive MTC (mMTC), and Ultra-Reliable and Low Latency Communication (URLLC).

DISCLOSURE OF THE INVENTION

Technical Task

An object of the present disclosure is to provide a method of receiving control information for SRS transmission by a UE in a wireless communication system.

Another object of the present disclosure is to provide a UE for receiving control information for SRS transmission in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, provided herein is a method of receiving control information for sounding reference symbol (SRS) transmission by a user equipment (UE) in a wireless communication system, including receiving control information including at least one of an SRS bandwidth (BW), the number of SRS blocks, or the length of one SRS block, configured for the UE, from a base station (BS); and transmitting an SRS based on the control information. The method may further include transmitting information including a peak-to-average power ratio (PAPR) capability of the UE related to the SRS transmission to the BS.

The information including the PAPR capability may include at least one of the size of a required SRS BW, the number of required SRS blocks, or the length of one SRS block. The information including the PAPR capability may include at least one of a maximum number of supportable SRS blocks, the length of a sequence per supportable SRS block, or the length of one supportable block. The information including the PAPR capability may be transmitted in message 3 (MSG3) in a random access channel (RACH) procedure.

The control information may further include information about an SRS parameter value to be applied to each SRS block corresponding to the number of the SRS blocks. The information about the SRS parameter may include at least one of a root index, a cyclic shift (CS) index, a transmission comb (TC), or a TC offset value.

The at least one of the SRS BW, the number of SRS blocks, or the length of one SRS block may be configured to satisfy a PAPR lower than a required PAPR corresponding to the PAPR capability. The number of the SRS blocks may be configured to satisfy the PAPR capacity in the SRS BW. The SRS parameter value may be configured to satisfy a PAPR of the SRS transmission lower than the required PAPR corresponding to the PAPR capability.

The control information may be received through downlink control information (DCI), a medium access control (MAC) control element (CE), or radio resource control (RRC) signaling. The at least one of the SRS BW, the number of SRS blocks, or the length of one SRS block may be configured in further consideration of SRS sequence allocation capacity demanded in a system. A unit of the SRS block may be a resource block (RB) or a resource element (RE). The SRS may be transmitted on concatenated SRS blocks consisting of SRS blocks corresponding to the number of the SRS blocks.

In another aspect of the present disclosure, provided herein a user equipment (UE) for receiving control information for sounding reference symbol (SRS) transmission in a wireless communication system, including a transmitter; a receiver; and a processor, wherein the processor may control the receiver to receive control information including at least one of an SRS bandwidth (BW), the number of SRS blocks, or the length of one SRS block, configured for the UE, from a base station (BS), and control the transmitter to transmit an SRS based on the control information.

The control information may further include information about an SRS parameter value to be applied to the SRS block. The processor may control the transmitter to transmit the SRS by applying an SRS parameter value to each SRS block corresponding to the number of the SRS blocks. The processor may control the transmitter to transmit information including a peak-to-average power ratio (PAPR) capability of the UE related to the SRS transmission to the BS, and at least one of the SRS BW, the number of SRS blocks, or the length of one SRS block may be configured to satisfy a PAPR of the SRS transmission lower than a required PAPR corresponding to the PAPR capability. The processor may control the transmitter to transmit the SRS on concatenated SRS blocks consisting of SRS blocks corresponding to the number of the SRS blocks.

Advantageous Effects

When a BW dependent SRS (LTE scheme) and a frequency position dependent SRS coexist in a network, a BS may configure, for cell-edge UEs, an SRS using a BW dependent SRS configuration method having a low PAPR due to restriction of transmission power and configure, for cell-centered UEs, a concatenated block SRS for flexible resource utilization, thereby raising resource utilization efficiency and improving communication performance.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the invention and are incorporated in and constitute a part of this specification, illustrate embodiments of the invention.

FIG. 8 illustrates cross-correlation and cubic-metric evaluation of ZC, Golay, and PN sequences.

MODE FOR INVENTION

Figure 1:
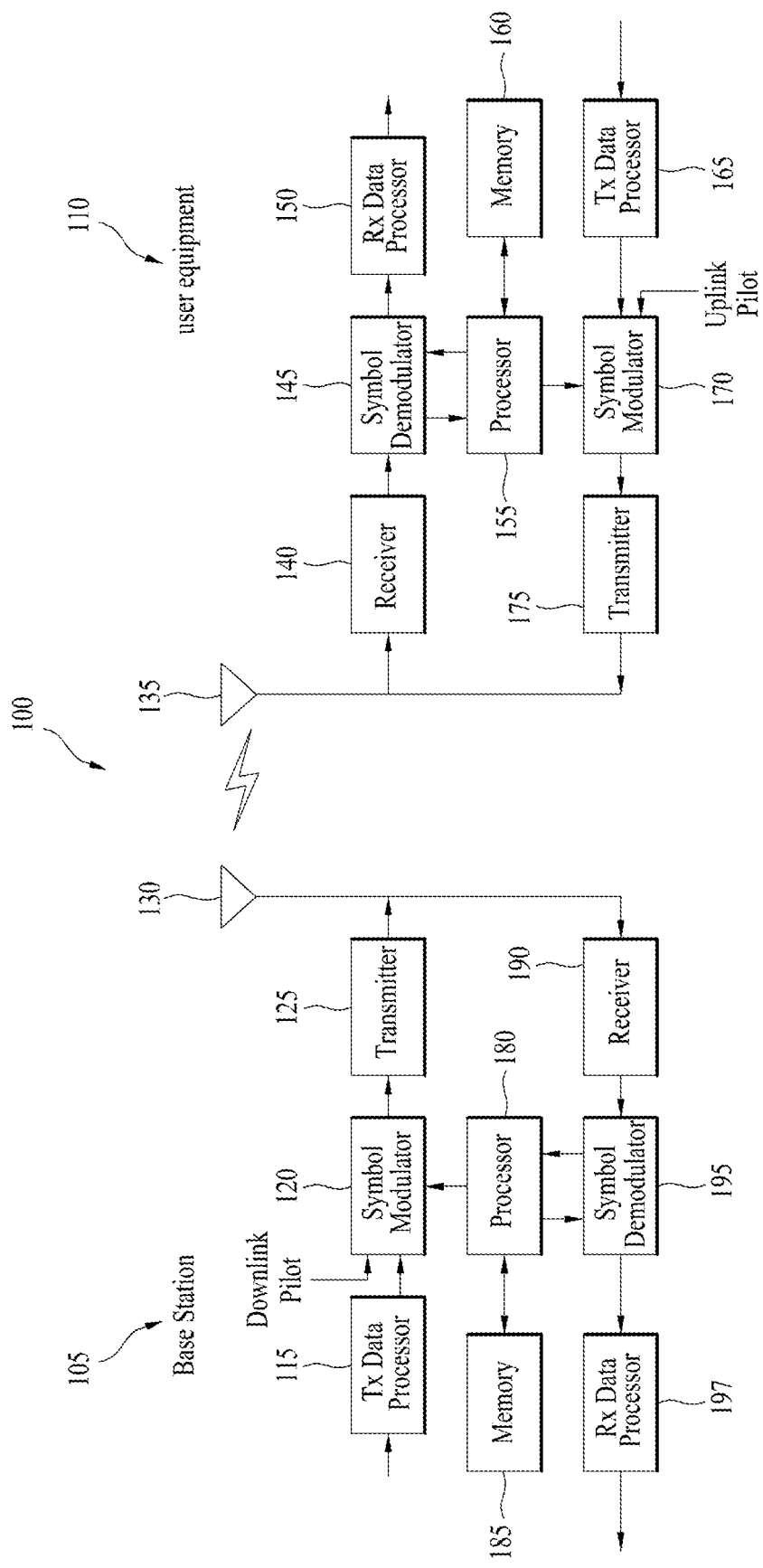
FIG. 1 is a block diagram for configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

First, Table 1 below shows details of SRS transmission in the 3GPP LTE/LTE-A system.

TABLE 1

A UE shall transmit Sounding Reference Symbol (SRS) on per serving cell SRS resources based on two trigger types:
trigger type 0: higher layer signalling
trigger type 1: DCI formats 0/4/1A for FDD and TDD and DCI formats 2B/2C/2D for TDD.
In case both trigger type 0 and trigger type 1 SRS transmissions would occur in the same subframe in the same serving cell, the UE shall only transmit the trigger type 1 SRS transmission.
A UE may be configured with SRS parameters for trigger type 0 and trigger type 1 on each serving cell. The following SRS parameters are serving cell specific and semi-statically configurable by higher layers for trigger type 0 and for trigger type 1.
Transmission comb $\bar{k}_{TC}$, as defined in subclause 5.5.3.2 of [3] for trigger type 0 and each configuration of trigger type 1
Starting physical resource block assignment $n_{RRC}$, as defined in subclause 5.5.3.2 of [3] for trigger type 0 and each configuration of trigger type 1
duration: single or indefinite (until disabled), as defined in [11] for trigger type 0
srs-ConfigIndex $I_{SRS}$ for SRS periodicity $T_{SRS}$ and SRS subframe offset $T_{offset}$, as defined in Table 8.2-1 and Table 8.2-2 for trigger type 0 and SRS periodicity $T_{SRS,\ 1}$, and SRS subframe offset $T_{SRS,\ 1}$, as defined in Table 8.2-4 and Table 8.2-5 trigger type 1
SRS bandwidth $B_{SRS}$, as defined in subclause 5.5.3.2 of [3] for trigger type 0 and each configuration of trigger type 1
Frequency hopping bandwidth, $b_{hop}$, as defined in subclause 5.5.3.2 of [3] for trigger type 0
Cyclic shift $n_{SRS}^{cs}$, as defined in subclause 5.5.3.1 of [3] for trigger type 0 and each configuration of trigger type 1
Number of antenna ports $N_p$ for trigger type 0 and each configuration of trigger type 1
For trigger type 1 and DCI format 4 three sets of SRS parameters, srs-ConfigApDCI-Format4, are configured by higher layer signalling. The 2-bit SRS request field [4] in DCI format 4 indicates the SRS parameter set given in Table 8.1-1. For trigger type 1 and DCI format 0, a single set of SRS parameters, srs-ConfigApDCI-Format0, is configured by higher layer signalling. For trigger type 1 and DCI formats 1A/2B/2C/2D, a single common set of SRS parameters, srs-ConfigApDCI-Format1a2b2c, is configured by higher layer signalling. The SRS request field is 1 bit [4] for DCI formats 0/1A/2B/2C/2D, with a type 1 SRS triggered if the value of the SRS request field is set to '1'.
A 1-bit SRS request field shall be included in DCI formats 0/1A for frame structure type 1 and 0/1A/2B/2C/2D for frame structure type 2 if the UE is
configured with SRS parameters for DCI formats 0/1A/2B/2C/2D by higher-layer signalling.

Table 2 below shows SRS request values for trigger type 1 of DCI format 4 in the 3GPP LTE/LTE-A system.

TABLE 2

| Value of SRS request field | Description |
|---|---|
| '00' | No type 1 SRS trigger |
| '01' | The 1$^{st}$ SRS parameter set configured by higher layers |
| '10' | The 2$^{nd}$ SRS parameter set configured by higher layers |
| '10' | The 3$^{rd}$ SRS parameter set configured by higher layers |

Table 3 below shows additional details of the SRS transmission in the 3GPP LTE/LTE-A system.

TABLE 3

The serving cell specific SRS transmission bandwidths $C_{SRS}$ are configured by higher layers. The allowable values are given in subclause 5.5.3.2 of [3].
The serving cell specific SRS transmission sub-frames are configured by higher layers. The allowable values are given in subclause 5.5.3.3 of [3].
For a TDD serving cell, SRS transmissions can occur in UpPTS and uplink subframes of the UL/DL configuration indicated by the higher layer parameter subframeAssignment for the serving cell.
When closed-loop UE transmit antenna selection is enabled for a given serving cell for a UE that supports transmit antenna selection, the index $a(n_{SRS})$, of the UE antenna that transmits the SRS at time $n_{SRS}$ is given by $a(n_{SRS}) = n_{SRS}$ mod 2, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \mod 2 & \text{when K is even} \\ n_{SRS} \mod 2 & \text{when K is odd} \end{cases},$$

$$\beta = \begin{cases} 1 & \text{where K mod 4 = 0} \\ 0 & \text{otherwise} \end{cases} \text{ when frequency hopping is enabled}$$

(i.e. $b_{hop} < B_{SRS}$), where values $B_{SRS}$, $b_{hop}$, $N_b$, and $n_{SRS}$ are given in $$\text{subclause 5.5.3.2 of [3], and } K = \prod_{b'=b_{hop}}^{B_{SRS}} N_b \text{ (where } N_{b_{hop}} = 1$$

regardless of the $N_b$ value), except when a single SRS transmission is configured for the UE. If a UE is configured with more than one serving cell, the UE is not expected to transmit SRS on different antenna ports simultaneously.
A UE may be configured to transmit SRS on Np antenna ports of a serving cell where Np may be configured by higher layer signalling. For PUSCH transmission mode 1 $N_p \in \{0, 1, 2, 4\}$ and for PUSCH transmission mode 2 $N_p \in \{0, 1, 2\}$ with two antenna ports configured for PUSCH and $N_p \in \{0, 1, 4\}$ with 4 antenna ports configured for PUSCH. A UE configured for SRS transmission on multiple antenna ports of a serving cell shall transmit SRS for all the configured transmit antenna ports within one SC-FDMA symbol of the same subframe of the serving cell.
The SRS transmission bandwidth and starting physical resource block assignment are the same for all the configured antenna ports of a given serving cell.
A UE not configured with multiple TAGs shall not transmit SRS in a symbol whenever SRS and PUSCH transmissions happen to overlap in the same symbol.
For TDD serving cell, when one SC-FDMA symbol exists in UpPTS of the given serving cell, it can be used for SRS transmission. When two SC-FDMA symbols exist in UpPTS of the given serving cell, both can be used for SRS transmission and for trigger type 0 SRS both can be assigned to the same UE.
If a UE is not configured with multiple TAGs, or if a UE is configured with multiple TAGs and SRS and PUCCH format 2/2a/2b happen to coincide in the same subframe in the same serving cell,
The UE shall not transmit type 0 triggered SRS whenever type 0 triggered SRS and PUCCH format 2/2a/2b transmissions happen to coincide in the same subframe;
The UE shall not transmit type 1 triggered SRS whenever type 1 triggered SRS and PUCCH format 2a/2b or format 2 with HARQ-ACK transmissions happen to coincide in the same subframe;
The UE shall not transmit PUCCH format 2 without HARQ-ACK whenever type 1 triggered SRS and PUCCH format 2 without HARQ-ACK transmissions happen to coincide in the same subframe.
If a UE is not configured with multiple TAGs, or if a UE is configured with multiple TAGs and SRS and PUCCH happen to coincide in the same subframe in the same serving cell,
The UE shall not transmit SRS whenever SRS transmission and PUCCH transmission carrying HARQ-ACK and/or positive SR happen to coincide in the same subframe if the parameter ackNackSRS-SimultaneousTransmission is FALSE;

TABLE 3-continued

For FDD-TDD and primary cell frame structure 1, the UE shall not transmit SRS in a symbol whenever SRS transmission and PUCCH transmission carrying HARQ-ACK and/or positive SR using shortened format as defined in subclauses 5.4.1 and 5.4.2A of [3] happen to overlap in the same symbol if the parameter ackNackSRS-SimultaneousTransmission is TRUE.
Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in the same subframe if the parameter ackNackSRS-SimultaneousTransmission is TRUE. A UE not configured with multiple TAGs shall not transmit SRS whenever SRS transmission on any serving cells and PUCCH transmission carrying HARQ-ACK and/or positive SR using normal PUCCH format as defined in subclauses 5.4.1 and 5.4.2A of [3] happen to coincide in the same subframe.
In UpPTS, whenever SRS transmission instance overlaps with the PRACH region for preamble format 4 or exceeds the range of uplink system bandwidth configured in the serving cell, the UE shall not transmit SRS. The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell UE shall transmit HARQ-ACK and SR using the shortened PUCCH format as defined in subclauses 5.4.1 and 5.4.2A of [3], where the HARQ-ACK or the SR symbol corresponding to the SRS location is punctured. This shortened PUCCH format shall be used in a cell specific SRS subframe of the primary cell even if the UE does not transmit SRS in that subframe. The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A of [3] for the transmission of HARQ-ACK and SR.
Trigger type 0 SRS configuration of a UE in a serving cell for SRS periodicity, $T_{SRS}$, and SRS subframe offset, $T_{offset}$, is defined in Table 8.2-1 and Table 8.2-2, for FDD and TDD serving cell, respectively. The periodicity $T_{SRS}$ of the SRS transmission is serving cell specific and is selected from the set {2, 5, 10, 20, 40, 80, 160, 320} ms or subframes. For the SRS periodicity $T_{SRS}$ of 2 ms in TDD serving cell, two SRS resources are configured in a half frame containing UL subframe(s) of the given serving cell.
Type 0 triggered SRS transmission instances in a given serving cell for TDD serving cell with $T_{SRS} > 2$ and for FDD serving cell are the subframes satisfying $(10 \cdot n_f + k_{SRS} - T_{offset}) \mod T_{SRS} = 0$,, where for FDD $k_{SRS} = \{0, 1, , , 0\}$ is the subframe index within the frame, for TDD serving cell $k_{SRS}$ is defined in Table 8.2-3. The SRS transmission instances for TDD serving cell with $T_{SRS} = 2$ are the subframes satisfying $k_{SRS} - T_{offset}$.
For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS in a subframe of radio frame m that is indicated by the parameter eimta-HarqReferenceConfig-r12 as a downlink subframe unless the UE transmits PUSCH in the same subframe.
Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set {2, 5, 10} ms or subframes.
For the SRS periodicity $T_{SRS,1}$ of 2 ms in TDD serving cell, two SRS resources are configured in a half frame containing UL subframe(s) of the given serving cell.
A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.
A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.
A UE configured for type 1 triggered SRS transmission on serving cell c upon detection of a positive SRS request in subframe n of serving cell c shall commence SRS transmission in the first subframe satisfying n + k, k ≥ 4 and $(10 \cdot n_f + k_{SRS} - T_{offset,1}) \mod T_{SRS,1} = 0$ for TDD serving cell c with $T_{SRS,1} > 2$ and for FDD serving cell c, $(k_{SRS} - T_{offset,1}) \mod 5 = 0$ for TDD serving cell c with $T_{SRS,1} = 2$ where for FDD serving cell c $k_{SRS} = \{0, 1, \ldots, 9\}$ is the subframe index within the frame $n_f$, for TDD serving cell c $k_{SRS}$ is defined in Table 8.2-3.
A UE configured for type 1 triggered SRS transmission is not expected to receive type 1 SRS triggering events associated with different values of trigger type 1 SRS transmission parameters, as configured by higher layer signalling, for the same subframe and the same serving cell.
For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe. A UE shall not transmit SRS whenever SRS and a PUSCH transmission corresponding to a Random Access Response Grant or a retransmission of the same transport block as part of the contention based random access procedure coincide in the same subframe.

Table 4 below shows the subframe offset configuration ($T_{offset}$) and UE-specific SRS periodicity ($T_{SRS}$) for trigger type 0 in FDD.

TABLE 4

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

Table 5 below shows the subframe offset configuration ($T_{offset}$) and UE-specific SRS periodicity ($T_{SRS}$) for trigger type 0 in TDD.

TABLE 5

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 6

| SRS Configuration Index $I_{SRS}$ | SRS Periodicity (ms) | SRS Subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |

TABLE 6-continued

| SRS Configuration Index $I_{SRS}$ | SRS Periodicity (ms) | SRS Subframe Offset |
|---|---|---|
| 45-84 | 40 | $I_{SRS}$ − 45 |
| 85-164 | 80 | $I_{SRS}$ − 85 |
| 165-324 | 160 | $I_{SRS}$ − 165 |
| 325-644 | 320 | $I_{SRS}$ − 325 |
| 645-1023 | reserved | reserved |

Table 7 shows $k_{SRS}$ for TDD.

TABLE 7

| | subframe index n | | | | | | | | | |
|---|---|---|---|---|---|---|---|---|---|---|
| | 1 | | | | | 6 | | | | |
| | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | 2 | 3 | 4 | | 5 | 6 | 7 | 8 | 9 |
| $k_{SRS}$ in case UpPTS length of 1 symbol | 1 | | 2 | 3 | 4 | | 6 | | 7 | 8 | 9 |

Table 8 below shows the subframe offset configuration ($T_{offset,1}$) and UE-specific SRS periodicity ($T_{SRS,1}$) for trigger type 1 in FDD.

TABLE 8

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$ − 2 |
| 7-16 | 10 | $I_{SRS}$ − 7 |
| 17-31 | reserved | reserved |

Table 9 below shows the subframe offset configuration ($T_{offset,1}$) and UE-specific SRS periodicity ($T_{SRS,1}$) for trigger type 1 in TDD.

TABLE 9

| SRS Configuration Index $I_{SRS}$ | SRS Periodicity (ms) | SRS Subframe Offset |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ − 10 |
| 15-24 | 10 | $I_{SRS}$ − 15 |
| 25-31 | reserved | reserved |

Analog Beamforming

In the millimeter wave (mmW) system, a short wavelength is used, and thus a plurality of antennas elements can be installed in the same area. In other words, the wavelength in the 30 GHz band is 1 cm, and accordingly a total of 64 (8×8) antenna elements may be installed at intervals of 0.5 lambda (wavelength) in a 2-dimensional array on a 4 by 4 cm panel. Therefore, in the mmW system, multiple antenna elements may be used to increase the beamforming (BF) gain to enhance the coverage or the throughput.

In this case, if each antenna element is provided with a transceiver unit (TXRU) to enable adjustment of transmit power and phase per antenna element, independent beamforming may be performed for each frequency resource. However, installing TXRUs in all the 100 antenna elements is less feasible in terms of cost. Therefore, a method of mapping a plurality of antenna elements to one TXRU and adjusting the direction of a beam using an analog phase shifter has been considered. However, this analog beamforming technique is disadvantageous in that frequency selective beamforming is not allowed because only one beam direction can be created over the full band.

As an intermediate form of digital BF and analog BF, hybrid BF with B TXRUs which are fewer than Q antenna elements may be considered. In the hybrid BF, the number of directions in which beams are allowed to be transmitted at the same time is limited to B or less, though it depends on how the B TXRUs and Q antenna elements are connected.

Figure 2A:
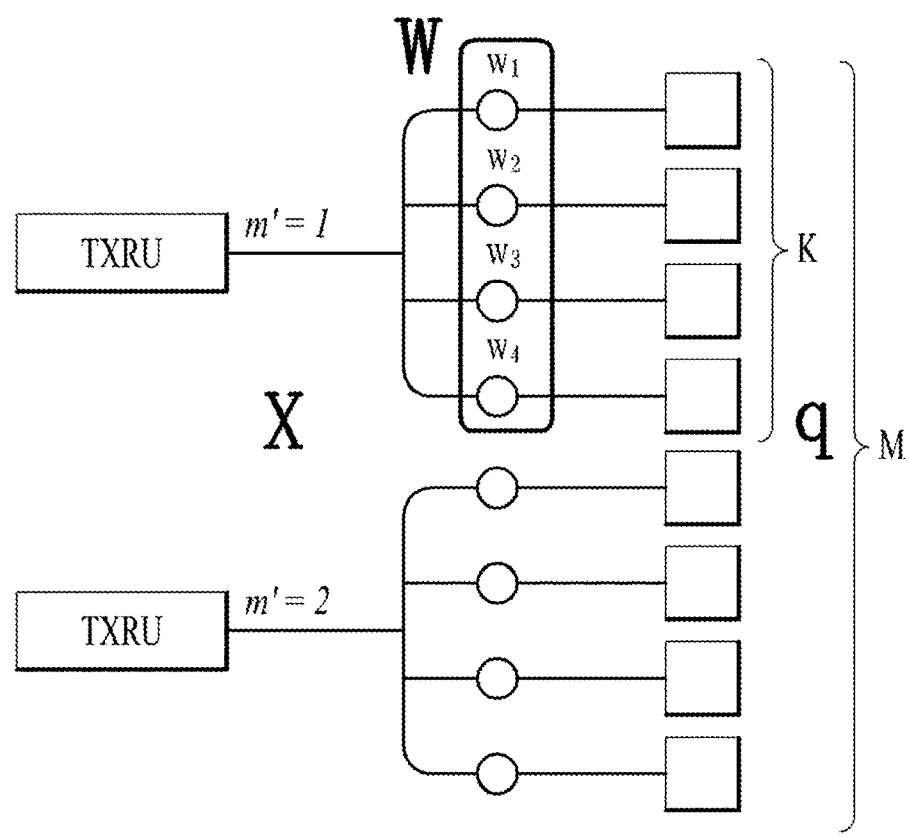
FIG. 2A is a diagram illustrating TXRU virtualization model option 1 (a sub-array model)
Figure 2B:
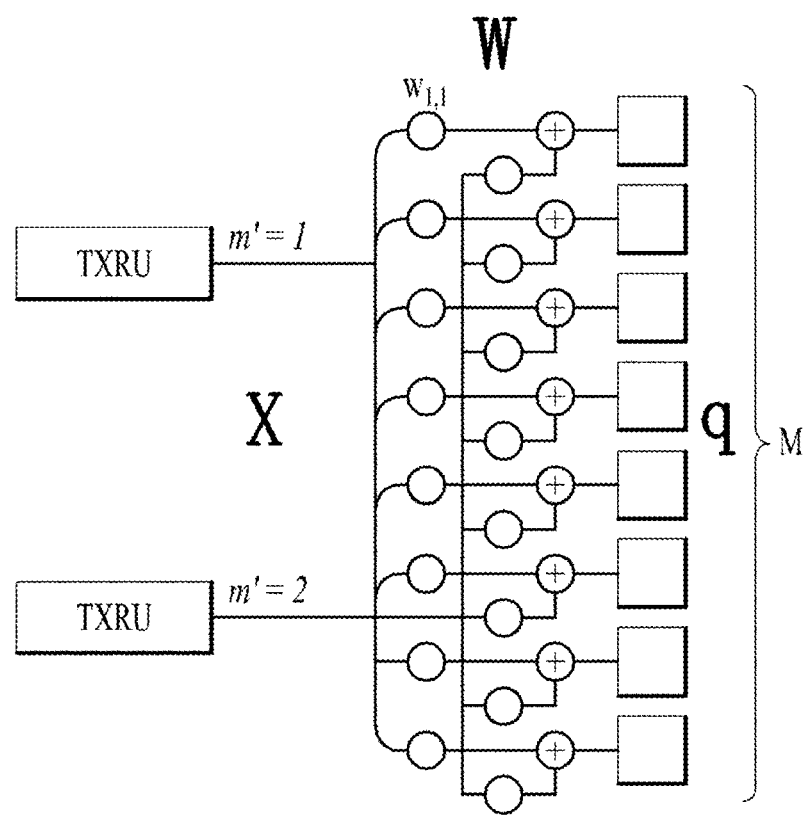
FIG. 2B is a diagram illustrating TXRU virtualization model option 2 (a full connection model).

FIG. 2A is a diagram illustrating TXRU virtualization model option 1 (a sub-array model), and FIG. 2B is a diagram illustrating TXRU virtualization model option 2 (a full connection model).

FIGS. 2A and 2B show representative examples of a method for connection of a TXRU and an antenna element. Here, the TXRU virtualization model shows the relationship between the output signal of the TXRU and the output signal of the antenna elements. FIG. 2A illustrates a scheme in which a TXRU is connected to a sub-array. In this case, the antenna elements are connected to only one TXRU. In contrast, FIG. 2B illustrates a scheme in which a TXRU is connected to all antenna elements. In this case, the antenna elements are connected to all TXRUs. In FIGS. 2A and 2B, W denotes a phase vector multiplied by an analog phase shifter. That is, the direction of analog beamforming is determined by W. Here, the mapping between the CSI-RS antenna ports and the TXRUs may be 1-to-1 or 1-to-many mapping.

Hybrid Beamforming

Figure 3:
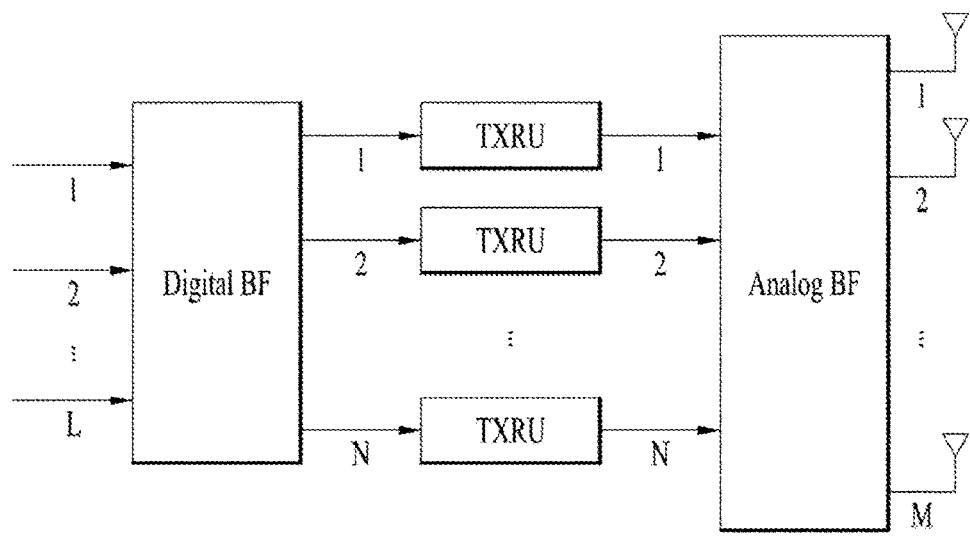
FIG. 3 is a block diagram for hybrid beamforming.

FIG. 3 is a block diagram for hybrid beamforming.

When multiple antennas are used in the New RAT system, a hybrid beamforming technique combining digital beamforming and analog beamforming may be used. In this case, analog beamforming (or RF beamforming) refers to an operation of performing precoding (or combining) in the RF stage. In the hybrid beamforming technique, each of the baseband stage and the RF stage may use precoding (or combining), thereby reducing the number of RF chains and the number of D/A (or a A/D) converters and exhibiting performance close to that of digital beamforming. As shown in FIG. 3, the hybrid beamforming structure may be represented by N transceiver units (TXRU) and M physical antennas for simplicity. Then, the digital beamforming for the L data layers to be transmitted from the transmitting side may be represented by an N by L matrix, and then N converted digital signals are converted into analog signals through the TXRUs and then subjected to analog beamforming represented by an M by N matrix.

FIG. 3 is an schematic diagram of a hybrid beamforming structure in terms of the TXRU and physical antennas. In FIG. 3, the number of digital beams is L, and the number of analog beams is N. Further, in the New RAT system, it is considered to design the base station to change analog beamforming on a symbol-by-symbol basis to support more efficient beamforming for a UE located in a specific area. Further, when N TXRUs and M RF antennas are defined as one antenna panel in FIG. 3, the New RAT system may introduce a plurality of antenna panels to which independent hybrid beamforming is applicable.

When a BS utilizes a plurality of analog beams, an analog beam which is advantageous for signal reception may differ among the UEs, and therefore a beam sweeping operation in which the BS changes a plurality of analog beams to be applied in a specific subframe (SF) on a symbol-by-symbol basis to allow all UEs to have a reception occasion may be considered.

Figure 4:
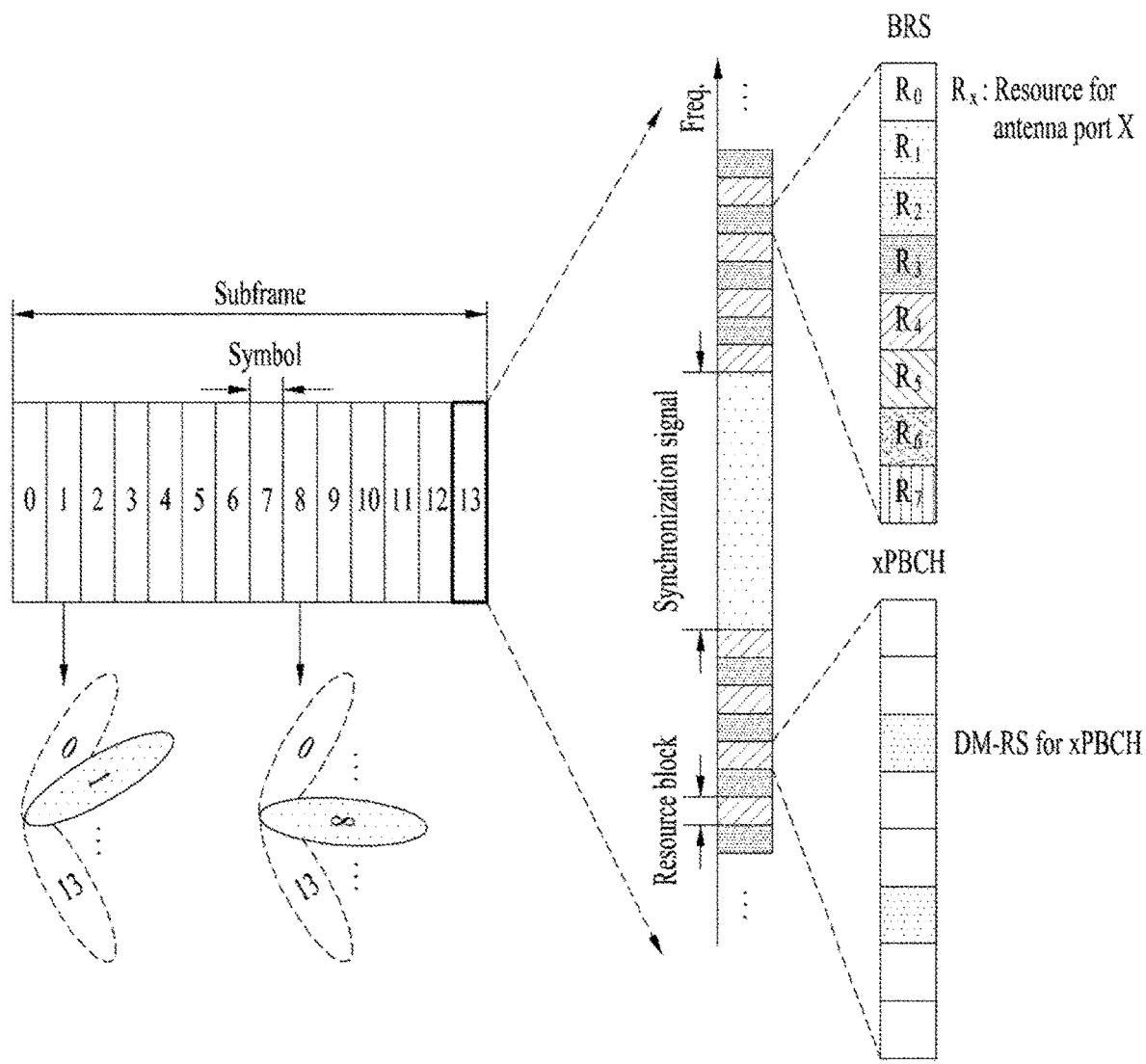
FIG. 4 is a diagram illustrating an example of beams mapped to BRS symbols in hybrid beamforming.

FIG. 4 is a diagram illustrating an example of beams mapped to BRS symbols in hybrid beamforming.

FIG. 4 illustrates the beam sweeping operation for a synchronization signal and system information in a downlink (DL) transmission process. In FIG. 4, a physical resource (or physical channel) on which the system information of the New RAT system is transmitted in a broadcast manner is referred to as a xPBCH (physical broadcast channel). Analog beams belonging to different antenna panels within one symbol may be transmitted simultaneously, and introduction of a beam RS (BRS) may be considered. The BRS is a reference signal (RS) transmitted by applying a single analog beam (corresponding to a specific antenna panel) as shown in FIG. 4 to measure a channel for each analog beam. The BRS may be defined for a plurality of antenna ports, and each antenna port of the BRS may correspond to a single analog beam. While the RS used to measure a beam is referred to as BRS in FIG. 4, it may be called by another name. In this case, unlike the BRS, the synchronization signal or the xPBCH may be transmitted by applying all analog beams in an analog beam group such that any UE can receive the synchronization signal or the xPBCH well.

Figure 5:
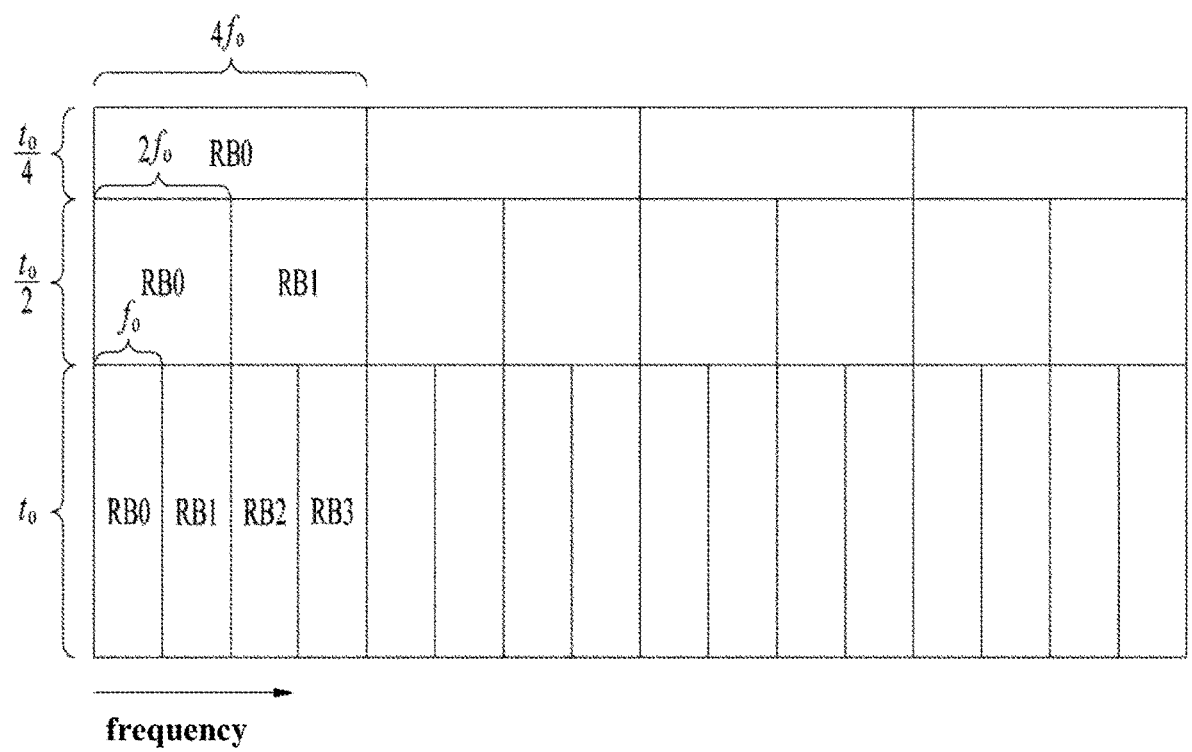
FIG. 5 is an exemplary diagram illustrating symbol/sub-symbol alignment between different numerologies.

FIG. 5 is an exemplary diagram illustrating symbol/sub-symbol alignment between different numerologies.

Features of New RAT (NR) Numerology

In the NR system, a method of supporting scalable numerology is considered. In other words, NR subcarrier spacing is expressed as (2n×15) kHz, where n is an integer. From the nested perspective, the above-mentioned subset or a superset (at least 15, 30, 60, 120, 240, and 480 kHz) is considered as the main subcarrier spacing. Symbol or sub-symbol alignment between different numerologies is supported by adjusting the numerologies to have the same CP overhead rate.

Also, numerology is determined in a structure in which the above-described time/frequency granularity is dynamically allocated according to the respective services (eMMB, URLLC, mMTC) and scenarios (high speed, etc.).

Bandwidth Dependent/Non-Dependent Sequence for Orthogonalization

The LTE system designs the SRS differently according to the sounding bandwidth. That is, a computer generated sequence is used for a sequence design with a length of 24 or less, and a Zadoff-Chu (ZC) sequence is used when the length is 36 (3 RBs) or more. The greatest advantage of the ZC sequence is that it exhibits low PAPR or low cubic metric and has ideal autocorrelation and low cross-correlation properties. However, in order to satisfy the above properties, the lengths of the required sequences (representing the sounding bandwidths) must be the same. Therefore, in order to support UEs having different sounding bandwidths, a method of allocating the UEs to different resource regions is needed. In order to minimize deterioration of channel estimation performance, IFDMA comb structures are configured to have different sounding bandwidths to support orthogonality of UEs that perform transmission simultaneously. If a transmission comb (TC) structure is used for a UE having a small sounding bandwidth, a sequence length that is less than the minimum sequence length with orthogonality (typically represented by length 24) may be given. Accordingly, TC is limited to 2. If the same TC is given on the same sounding resource, a dimension that provides orthogonality is needed, which employs CDM using cyclic shift.

There are sequences which have slightly lower PAPR and correlation performance than the ZC sequence but can be subjected to resource mapping regardless of the sounding bandwidth. Examples of such sequences include a Golay sequence and a pseudo random (PN) sequence. In the case of Golay sequences, when autocorrelation values of sequences a and b are $A_a$ and $A_b$, the sequences a and b are called a Golay complementary sequence pair if the sum of the autocorrelation values satisfies the following condition: $A_a+A_b=\delta(x)$).

Figure 6:
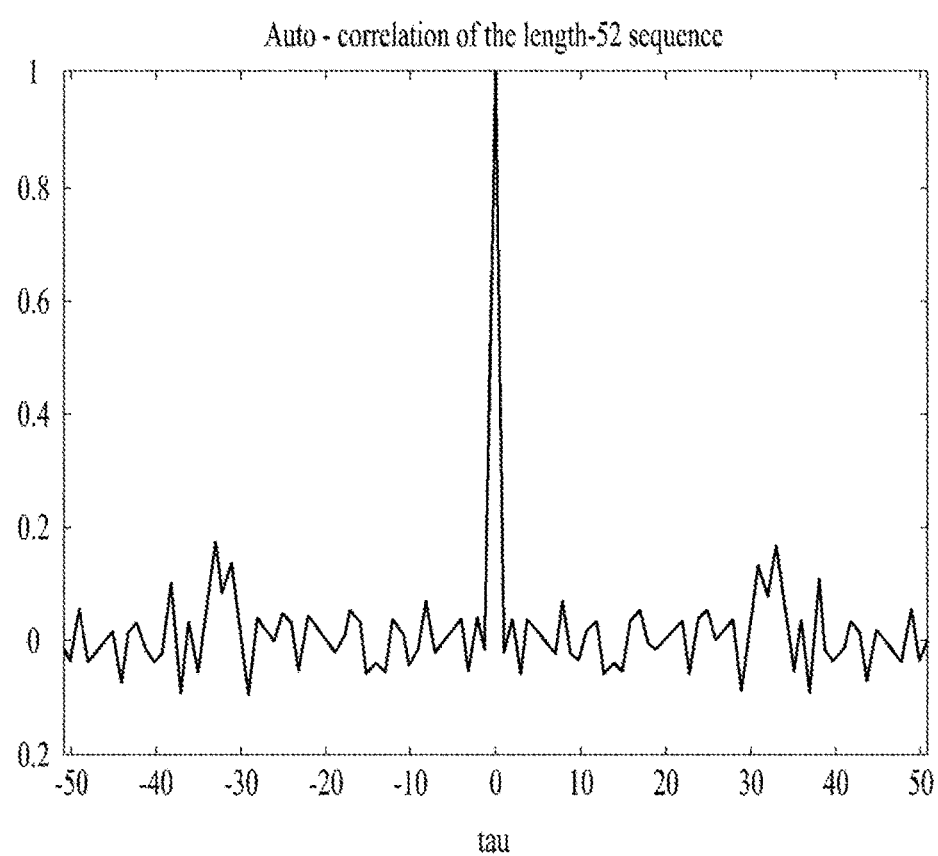
FIG. 6 illustrates performance of 52-length autocorrelation using two 26-length Golay Complementary Sequence pairs.

As an example, when Golay sequences a and b of length 26 are a=[1 −1 1 1 −1 −1 1 −1 −1 −1 −1 1 −1 1 −1 −1 −1 −1 1 1 1 −1 −1 −1 1 −1 1 1] and b=[−1 1 1 −1 −1 1 1 1 −1 1 1 1 1 −1 −1 −1 −1 −1 −1 −1 −1 1 1 −1 −1 −1 1 −1 1], a length-52 sequence may be configured by concatenating the two sequences, and when 0 is mapped to 4 resource elements (REs) on both sides, the auto-correlation performance may be obtained as shown in FIG. 6. FIG. 6 shows the performance of 52-length autocorrelation using two 26-length Golay complementary sequence pairs.

Figure 7:
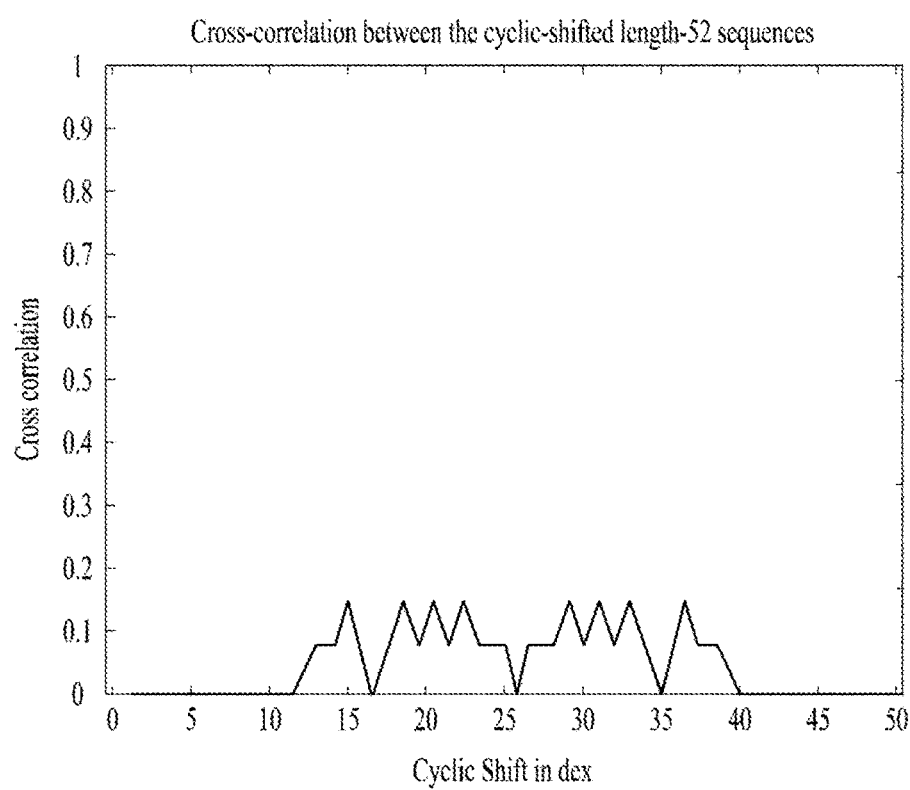
FIG. 7 illustrates cross-correlation between sequences having different CSs in a Golay sequence of length 52.

FIG. 7 illustrates cross-correlation between sequences having different CSs in a Golay sequence of length 52.

A plurality of Golay sequences may be generated by applying multiple cycle shifts (CS) to the sequence configured to have the length-52. Cross-correlation between Golay sequences subjected to different CSs is shown in FIG. 7.

FIG. 8 illustrates cross-correlation and cubic-metric evaluation of ZC, Golay, and PN sequences.

For the relationship between the ZC, Golay, and PN sequences, cubic metric (CM) and cross-correlation were calculated according to cases where TC is 1, 2, and 4, respectively, and the calculation results of the respective cases were compared with each other. The assumptions which are made for the evaluation are as follows.

The sounding bandwidth is set to 4, 8, 12, 16, 20, 24, 32, 36, and 48 RB (based on LTE SRS design).)

As in the LTE system, the 30 groups number $u=(f_{gh}(n_s)+f_{ss})$mod 30 is determined as follows, and $(f_{gh}(n_s),f_{ss})$ is determined based on cell ID. When the bandwidth is 4 RBs, one base sequence v is selected. For the other bandwidths, two base sequence numbers v are selected.

For the Golay sequence, a truncated binary Golay sequence with length 2048 in the 802.16m system was used, and a QPSK PN sequence is shown as an example of an independent bandwidth SRS design. In order to represent 30 groups in the ZC sequence, the Golay sequence was generated using 30 CSs, and 30 PN sequences were generated based on Matlab.

Evaluation was conducted with TC=1, 2 and 4.

For cubic metric evaluation, the oversampling factor (OSF) was set to 8 for better resolution.

Referring to FIG. 8(a), the ZC sequence exhibited higher cross correlation performance than the Golay sequence, which exhibited higher cross correlation performance than the PN sequence (ZC>Golay>PN). The ZC sequence exhibited higher CM performance than the Golay sequence, which exhibited higher CM performance than the PN sequence (ZC>Golay>PN). In terms of generation of an SRS sequence for UL transmission, the ZC sequence may be seen as exhibiting better performance as in the LTE system. However, in order to increase the degree of freedom of each UE in allocating the sounding bandwidth, the Golay sequence or the PN sequence may also be considered as a SRS sequence candidate of the New RAT system.

Table 10 below shows methods for generating SRS sequences.

TABLE 10

To down-select one method for NR SRS sequence generation based on at least the following alternatives:
Alt-1: SRS sequence is a function of the sounding bandwidth and does not depend on the sounding bandwidth position or the PRB position.
Sequence design and other design details are FFS.
Alt-2: SRS sequence is a function of the sounding bandwidth position or the PRB position.
Sequence design and other design details are FFS.
Taking into account metrics such as PAPR, capacity/flexibility, etc.
Other parameters, if any, determining SRS sequence are FFS (e.g. SRS sequence ID)

For SRS sequence generation methods in the NR system, the methods of Alt-1 and Alt-2 in Table 10 may be considered. In Alt-1, an SRS bandwidth is configured and then used to generate a sequence, but the sequence is generated irrespective of the SRS resource start position. An example of this method may be the LTE SRS sequence generation and mapping method.

A sequence that is a function of the sounding bandwidth represents the ZC sequence. In other words, in the ZC-based sequence $$x_q(m) = e^{-j\frac{\pi q m(m+1)}{N_{ZC}^{RS}}},$$

$0 \le m \le N_{ZC}^{RS}-1$, $N_{ZC}^{RS}$ is seen as a function of bandwidth. Sequences that can be generated regardless of the SRS bandwidth may be PN-based sequences or Golay-based sequences. In addition, since the sequence generation of the ZC sequence is not changed according to the SRS mapping position, the ZC sequence is one of the sequences satisfying the method of Alt-1 in Table 10.

Figure 9:
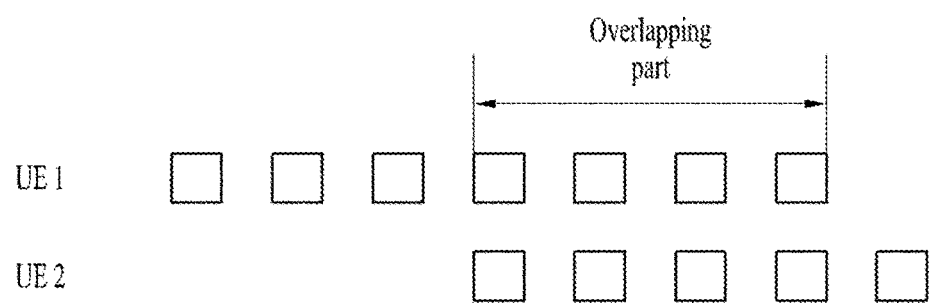
FIG. 9 is a diagram illustrating a difficulty in maintaining orthogonality for an overlapping portion in free frequency mapping when a ZC sequence is used.

FIG. 9 is a diagram illustrating a difficulty in maintaining orthogonality for an overlapping portion in free frequency mapping when a ZC sequence is used.

The LTE system allows various SRS bandwidths to be provided to each UE using the ZC sequence, and uses the transmission comb (TC) to attenuate intra-cell interference to lower degradation of channel estimation performance degradation. The LTE system also uses cyclic shift (CS) to maintain orthogonality between the ports. This is a useful sequence design method that has the lowest PAPR and is thus capable of providing more transmission power to cell-edge UEs. However, this scheme decreases the degree of freedom in resource allocation. In particular, in order to allow UEs having different SRS bandwidths to overlap with each other, it is necessary to use FDM, that is, different TCs.

The NR system requires a method for maintaining orthogonality even in overlapping of one or more partial bands due to more orthogonal UEs and TRP numbers. One more consideration in this requirement is to determine the extent to which the overlapping is allowed. When overlapping is configured to allow a degree of freedom, if the orthogonality is to be maintained with the Golay sequence or the PN sequence, the sequences of the overlapping portions may be shared and different CSs may be given. This method shows that sequence generation changes depending on the SRS arrangement position (which is considered as an example of Alt-2 in Table 12).

As an example, in the case of the Golay sequence, when different bandwidths are allocated to the respective UEs, the sequence should be nested from the overlapping position. That is, resources needed to be allocated in a nested structure between UEs having different bandwidths at a specific frequency position i to maintain orthogonality. That is, UE-1 sounding sequence=$[G^{(u,i)}G^{(u,i+2)}G^{(u,i+4)}G^{(u,i+6)}]$, and UE-2 sounding sequence=$[G^{(u,i)}G^{(u,i+2)}G^{(u,i+4)}G^{(u,i+6)}G^{(u,i+8)}G^{(u,i+10)}G^{(u,i+12)}G^{(u,i+14)}]\times e^{(-2j\pi\alpha(k))}$. Here, G(u) is time-domain cyclic shifts (CDM) of the truncated Golay sequence. This feature means that the sequences are dependent on the SRS resource position, and the method is a design method satisfying the Alt-2 method in Table 10.

However, when the ZC sequence is used, this method is not available. If two UEs with different SRS bandwidths partially overlap with each other, the sequences of overlapping portions cannot be orthogonalized. The reason is that the sequences are dependent on the bandwidth. In order to allow orthogonality, overlapping may be allowed by only a certain block, and a sequence may be configured on a block-by-block basis. Therefore, a concatenated block SRS that generates a sequence in a specific small block unit and expresses a SRS bandwidth as a group of such small blocks.

Figure 10:
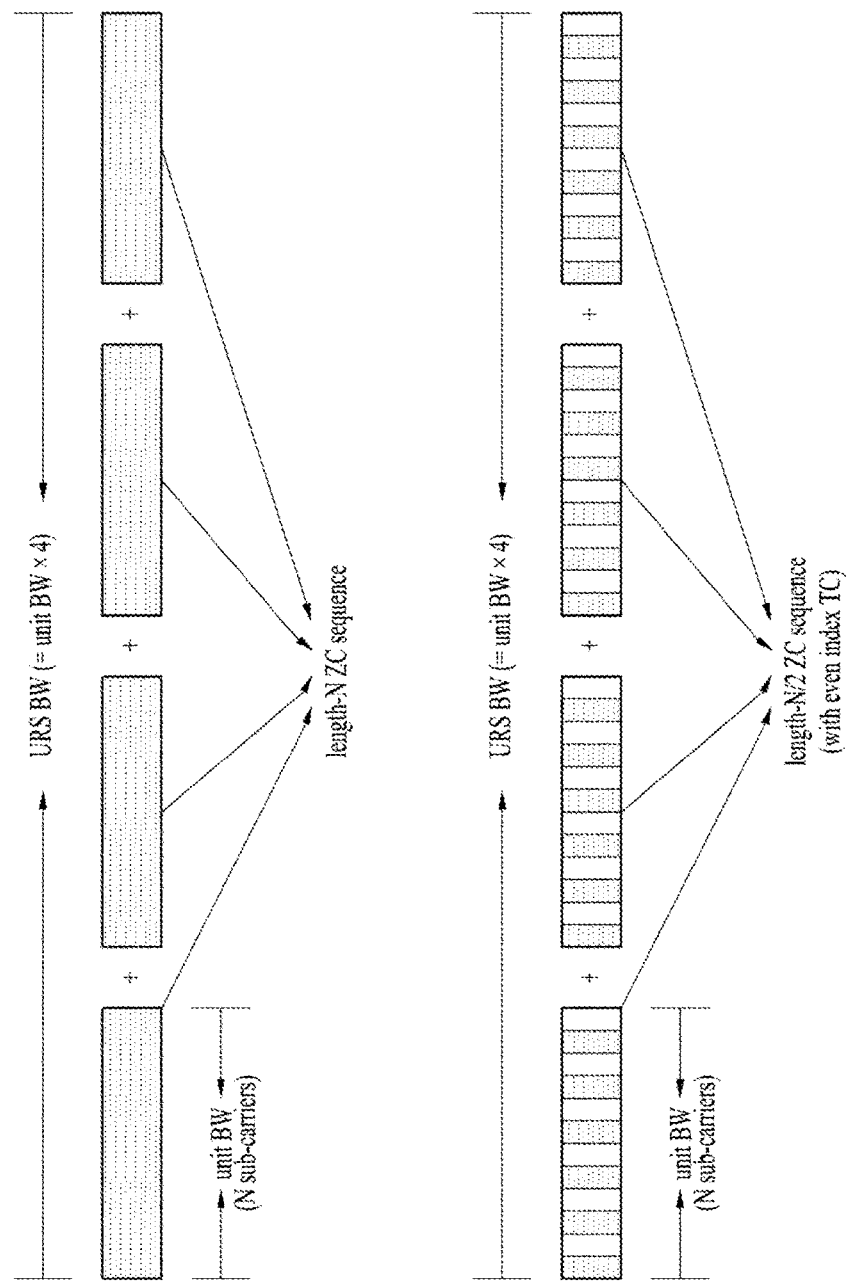
FIG. 10 is a diagram illustrating a structure of a concatenated block SRS configured in units of multiple ZC sequences.

FIG. 10 is a diagram illustrating a structure of a concatenated block SRS configured in units of multiple ZC sequences.

In the structure shown in FIG. 10, when a BS is configured to perform SRS resource allocation on the basis of a unit bandwidth (BW) starting point and orthogonally generate a BW-based sequence allocated to the unit BW for each UE, sequences may be generated regardless of the position with respect to the unit BW. As an example, when UE 1 and UE 2 have different bandwidths, if sequence generation per unit bandwidth is orthogonally specified between the two UEs, various starting positions may be configured for the UEs on a unit bandwidth basis.

Figure 11:
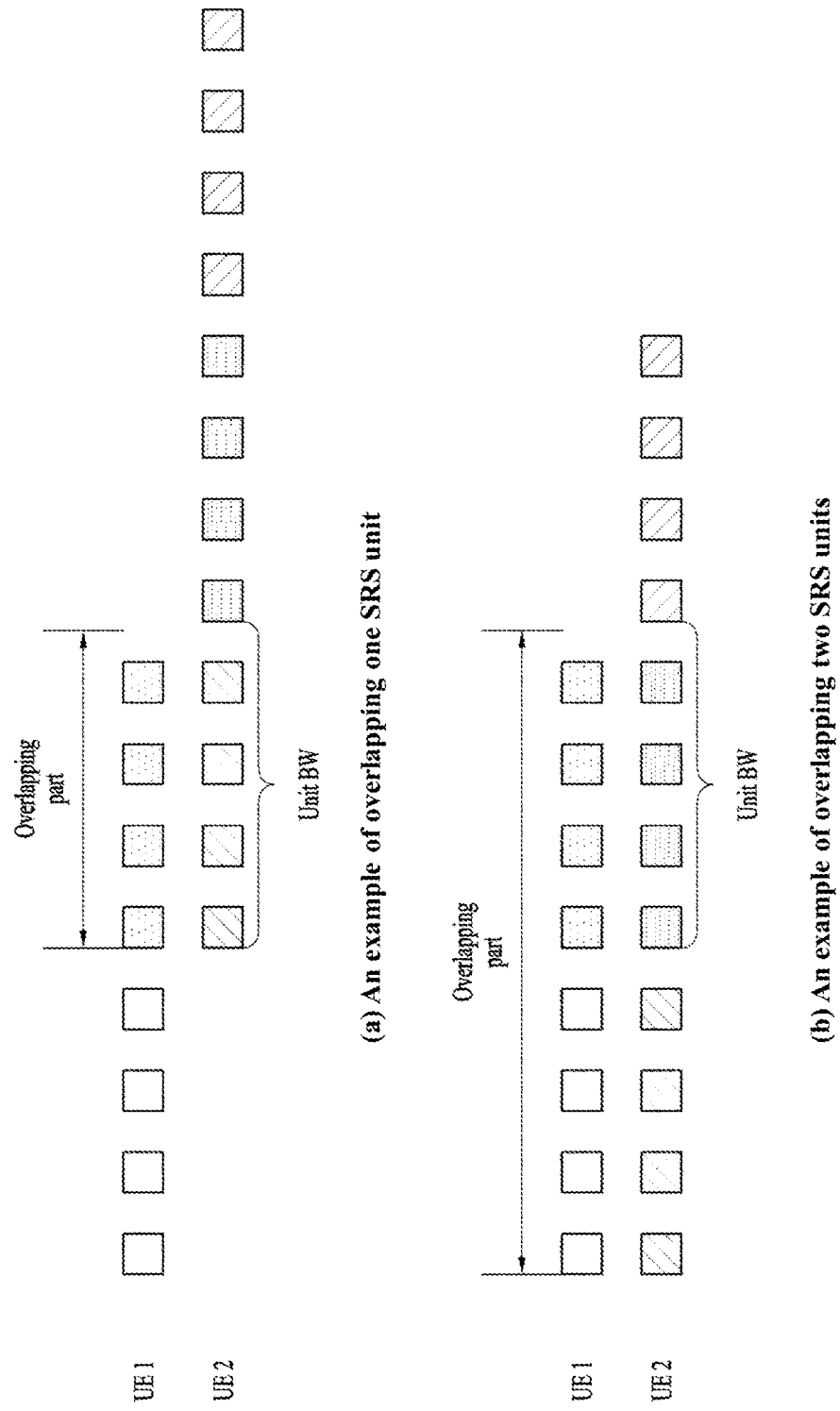
FIG. 11 illustrates SRS unit overlapping.

FIG. 11 illustrates SRS unit overlapping.

FIG. 11(a) illustrates overlapping of one SRS unit, and FIG. 12(b) illustrates overlapping of two SRS units.

The resource mapping start position can be freely specified on an SRS bandwidth unit basis. This structure may easily represent the SRS bandwidth configuration by the number of SRS bandwidth units. That is, in FIG. 11, the bandwidth of UE 1 may be represented by 2 SRS units, and the SRS bandwidth of UE 2 may be composed of 3 SRS units.

Accordingly, the concatenated SRS structure may be a structure that satisfies the Alt-1 method that may use a ZC sequence and freely allocate SRS to each UE within the unit. If the root value of the ZC sequence changes according to the SRS arrangement position in this structure, a sequence satisfying the Alt-2 structure may also be obtained.

However, there are some issues to be addressed for SRS design considering concatenated short sequence.

Since the short sequence is a BW-based sequence, the number of UEs that may overlap with each other in one BW unit is limited. That is, when the SRS BW unit length=4 RBs, and TC=2, a ZC sequence of length 24 may be generated per BW unit and 22 orthogonal sequences may be generated. That is, the BS may allocate sequences to up to 22 UEs in the BW unit in an orthogonal manner. Therefore, when a large number of UEs are supported, resource allocation and sequences allocated to the respective UEs need to be carefully designed in supporting the overlapping.

Increased overhead: A UE may have multiple BW units. When the overhead for configuration of one SRS bandwidth is L, the overhead necessary for the SRS bandwidth of the UE configured with M BW units is L*M (which is a feature of the Alt-2 method).

Figures 12, 13:
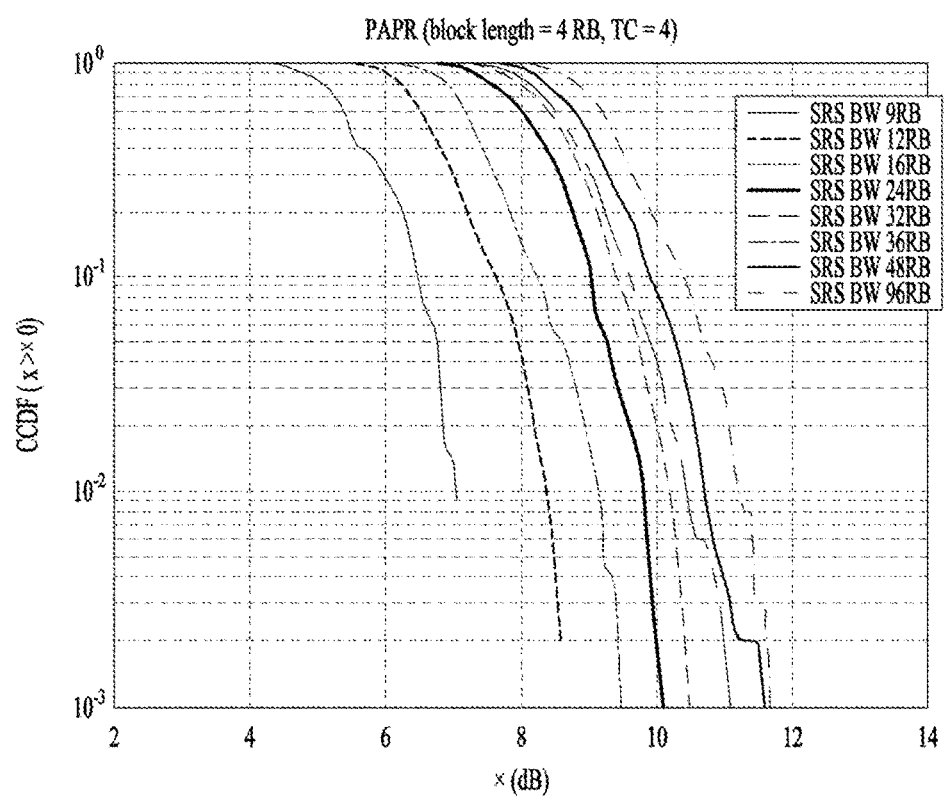
FIG. 12 is a diagram illustrating a ZC sequence (of length $M_1$) and a CS index $n_i \in \{0, 1, \ldots, M_1-1\}$ of one block.
FIG. 13 is a diagram illustrating a peak-to-average power ratio (PAPR) in an arrangement of ZC sequence blocks having a fixed block length of 4 RBs over an SRS BW and FIG. 14 is a diagram illustrating a PAPR in an SRS BW of 96 RBs and a variable block length.

FIG. 12 is a diagram illustrating a ZC sequence (of length $M_1$) and a CS index $n_f \in \{0, 1, \ldots, M_1-1\}$ of one block.

For SRS resource allocation to a large number of UEs or in units (i.e., UE transmission and reception points (TRPs) or UE panels) required for orthogonal SRS mapping in one block, different CS values are provided in one block so as to apply the different CS values to one block. That is, as illustrated in FIG. 12, an SRS sequence may be mapped to blocks over an SRS BW by providing a different CS value to one short block.

In the example of FIG. 12, for a low correlation of UEs or UE TRPs having different CS indexes, a sequence length in a block and the length $M_1$ may be set to be equal. Accordingly, a sequence having more low-correlated properties may be generated in one block.

Figure 14:
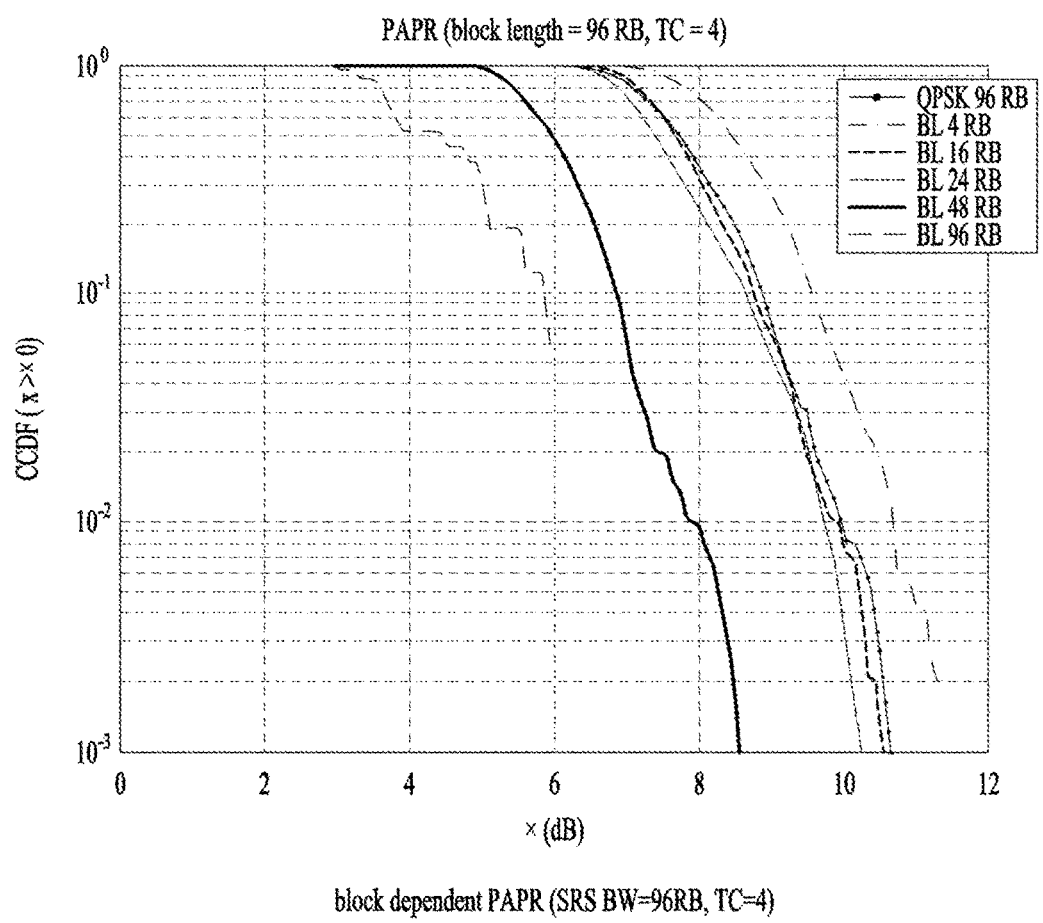

FIG. 13 is a diagram illustrating a peak-to-average power ratio (PAPR) in an arrangement of ZC sequence blocks having a fixed block length of 4 RBs over an SRS BW and FIG. 14 is a diagram illustrating a PAPR in an SRS BW of 96 RBs and a variable block length.

FIG. 13 illustrates an SRS BW dependent PAPR (block length=4 RBs, TC=4, ZC sequence, and IFFT=2048) and FIG. 14 illustrates a block dependent PAPR (SRS BW=96 RBs, TC=4, ZC sequence, and IFFT=2048).

FIG. 13 illustrates a PAPR when ZC sequence blocks having a fixed block length of 4 RBs are arranged over an SRS BW and it may be appreciated that, if an SRS BW is 8 RBs, two blocks are configured. FIG. 14 illustrates a PAPR in an SRS BW of 96 RBs and a variable block length. That is, it may be appreciated that, if the block length is 8 RBs, 12 blocks are configured.

It may be appreciated from the results illustrated in FIGS. 13 and 14, if the number of blocks increases, the PAPR increases and, therefore, it is necessary to appropriately restrict the number of blocks according to PAPR requirements of each UE.

Prior to description of the present disclosure, a random access channel (RACH) procedure related to message 3 (MSG3) in an RACH operation will now be described in brief.

Figure 15:
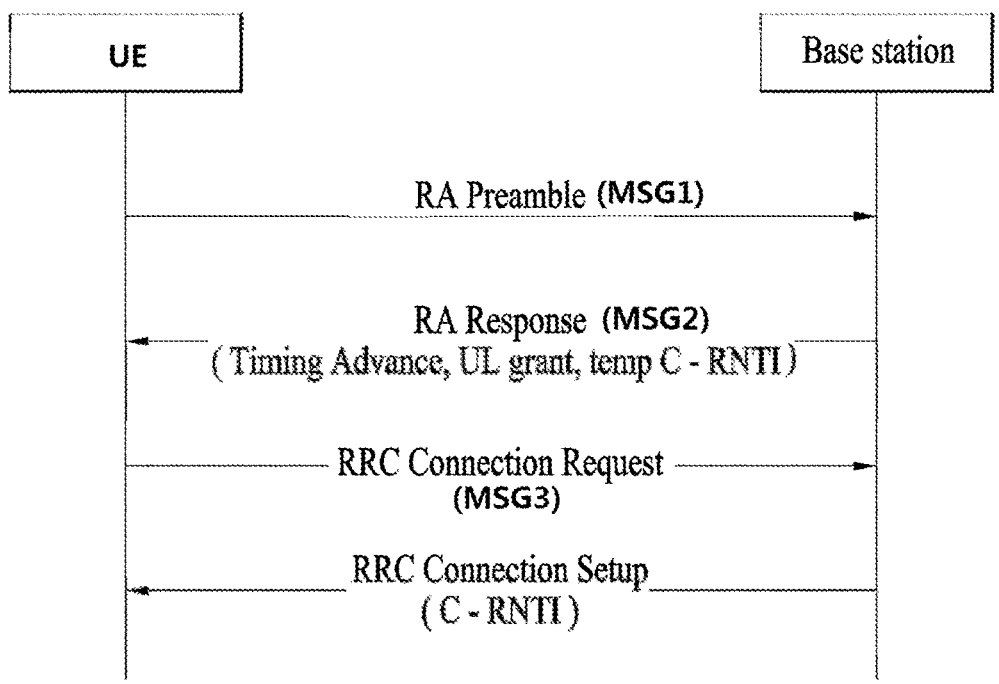
FIG. 15 is a diagram illustrating an RACH procedure in a 3GPP LTE/LTE-A communication system.

FIG. 15 is a diagram illustrating an RACH procedure in a 3GPP LTE/LTE-A communication system.

To support a connection-based transmission method and support connectivity transmission in an LTE system, a UE requests connectivity transmission through the RACH procedure. Referring to FIG. 15, the UE transmits a random access (RA) preamble (which is also called an RACH preamble) (MSG1) to a BS. The BS transmits an RA response as a response to the RA preamble to the UE. Herein, the RA response (MSG2) may include a timing advance, a UL grant, and a temporary C-RNTI. Next, the UE performs a radio resource control (RRC) connection setup procedure with the BS. Particularly, the UE transmits an RRC connection request message (MSG3) to the BS and the BS transmits an RRC connection setup message to the UE. After RRC connection between the UE and the BS is performed, the UE may perform communication with the BS.

Proposal 1

The UE may UE-specifically report, to the BS, message 3 (MSG3) in an RACH operation including a capability or category for PAPR requirements over an UL control channel or a UL data channel. Reporting for the PAPR requirements may include at least one of the following parameters:

(1) the size of a required SRS BW,
(2) the number of required blocks,
(3) the length of one block (RB unit/RE unit), and
(4) various combinations of (1), (2), and (3).

The PAPR capability or category of the UE may be represented as necessary power backoff when the UE calculates the received signal received power (RSRP) or received power of DL channels and performs UL transmission in consideration of PAPR requirements considering power amplifier (PA) performance of a UE transmitter. The BS may perform SRS configuration with reference to information about PAPR requirements reported by each UE.

Proposal 1-1

In addition to Proposal 1, the UE may further report at least one of the following information as capability report information according to a PAPR in addition to the report information for the PAPR requirements of Proposal 1:

(5) a maximum number of supportable blocks,
(6) the length of a sequence per supportable block which may be represented as transmission comb (TC) information per block and the length of a block,
(7) the length of one supportable block/ratio of configured SRS BW, and
(8) various combinations of (5), (6), and (7).

As an example, if the UE reports (5) the maximum number ($\Psi_{max}$) of supportable blocks and (2) the length ($l_{block}$) of one block described above in addition to the PAPR capability information to the BS, the BS may be aware of a maximum transmittable SRS BW ($B_{max} = \Psi_{max} \cdot l_{block}$) when concatenated block SRS transmission is configured for the UE performing reporting. Accordingly, the BS may provide information about concatenated block SRS configuration having the number ($\Psi'$) of blocks corresponding to $B' \leq B_{max}$ and the length $l_{block}$ of a block to the UE.

As another example, the UE may report, to the BS, information about the length of a sequence per supportable block (e.g., the number of possible blocks in a 4-RB block) in addition to the PAPR capability information.

Proposal 2

According to the reported PAPR capability or category, the BS may configure the SRS BW, the number of SRS blocks, and the length of one block to have a PAPR lower than a specific PAPR and transmit this information through downlink control information (DCI), a MAC control element (CE), or RRC signaling. It is apparent that Proposal 2 is based on the premise that concatenated SRS blocks are arranged over an SRS BW based on one symbol. In relation to SRS transmission based on the reported PAPR capability or category, the BS may selectively configure the following options.

The SRS BW may be configured through RRC and the length of the SRS block and/or the number of SRS blocks may be configured (or transmitted) through the DCI or the MAC CE. As another example, the SRS BW and/or the length of SRS block may be configured (or transmitted) through RRC or the SRS BW, the length of the SRS block, and/or the number of SRS blocks may be configured (or transmitted) through the DCI or the MAC CE.

Proposal 2-1

The length of one block is fixed and the SRS BW is limited to the number of SRS blocks so as to have a PAPR lower than a target PAPR. In this case, the BS may configure arrangement of parameters (e.g., a root index, a block CS index, a TC, and/or a TC offset) for orthogonality or a low correlation of each block to have a low PAPR and transmit the parameters to the UE.

As an embodiment, when the length of a block is 4 RBs and a target PAPR is 7.0 dB, if it is possible to set the PAPR to 7.0 dB or less when the number of blocks is 4, the BS may set the SRS BW to 16 RBs so that the SRS BW consists of 4 blocks. The BS sets a root value which should be configured for one block and a CS value in the block and provides the set information to the UE. Since the length of one block is fixed, partial overlapping of UEs for which a concatenated block SRS is configured may be supported. However, if a target SRS BW of any UE is 96 RBs, only an SRS BW of 16 RBs may be supported based on the above case. Therefore, a target SRS BW may be supported through frequency hopping during a plurality of SRS symbols/slots.

Proposal 2-2

The BS sets the length of one block by fixing the SRS BW and limiting the PAPR to a value lower than a target PAPR. In this case, arrangement of parameters (e.g., a root index, a block CS index, a TC, and/or a TC offset) for orthogonality or a low correlation of each block may be set to have a low PAPR.

As an embodiment, when the SRS BW of a specific UE is fixed to 96 RBs and a target PAPR is 8.0 dB, if it is possible to set the PAPR to 8.0 dB or less when the number of blocks is 4, the BS sets the length of one block to 24 RBs, sets a root value of each block and a CS value in the block, and transmits this set information to the UE. Although the target SRS BW of a specific UE can be supported, flexible utilization may be implemented only between UEs for which the same sequence length is configured in the same block length (e.g., a UE (TC=4) having SRS BW=16 RBs and one block and a UE (TC=4) having SRS BW=64 RBs and 4 blocks have the same sequence length (48 REs) so that a root index that is low-correlated in one block and a CS in the block may be configured for each UE). To lower the PAPR, the BS may configure different TCs or different TC offset values for respective blocks so as not to allocate a specific TC value to the entire SRS BW.

Proposal 3

A combination for arrangement of parameters (e.g., a root index and a block CS index) for orthogonality or a low correlation of each block may be set to be lower than a required PAPR. For example, in an SRS consisting of two blocks [$S_1$, $S_2$], among a set $S_1=\{[q_1\ m_1], [q_1\ m_2], \ldots, [q_N\ m_M]\}$ of combinations of N roots and M block CSs in the first block and $S_2=\{[q_1\ m_1], [q_1\ m_2], \ldots, [q_N\ m_M]\}$, if the first block is selected as $S_1=\{[q_1\ m_1]\}$ satisfying a PAPR lower than specific PAPR0, the second block may be selected as one from among $S_2=\{[q_1\ m_2], [q_3\ m_4], [q_7\ m_3]\}$ when a parameter subset satisfying a PAPR lower than PAPR0 is $S_2=\{[q_1\ m_2], [q_3\ m_4], [q_7\ m_3]\}$.

As an embodiment, when the length of one block of a specific UE is 4 RBs, a SRS BW is 8 RBs, and a TC is 4, the SRS BW may consist of two blocks. Since a sequence length in one block is 12 REs, a total of 132 low-correlation sequences may be generated from one block using 11 roots and 12 CSs in the block when a ZC sequence is used. In this case, it is assumed that the BS receives reporting indicating that a target PAPR is 4.8 dB from the specific UE. If a set of root and CS parameters of the first block is set to $S_1=\{[4\ 9]\}$, there are 17 combinations of parameters of the second block satisfying a PAPR lower than a target PAPR of 4.8 dB, i.e., $S_2=\{[1,6],[1,7],[1,8],[1,9],[3,5],[5,10],[6,6],[6,7],[7,6],$ [7, 7],[8, 7],[8, 8],[10, 8], [10, 9], [11, 1],[11, 7],[11, 8]\}$. Therefore, the BS may select any one of the 17 combinations as root and CS parameters for the second block and then transmit the selected parameters to the UE.

Figure 16:
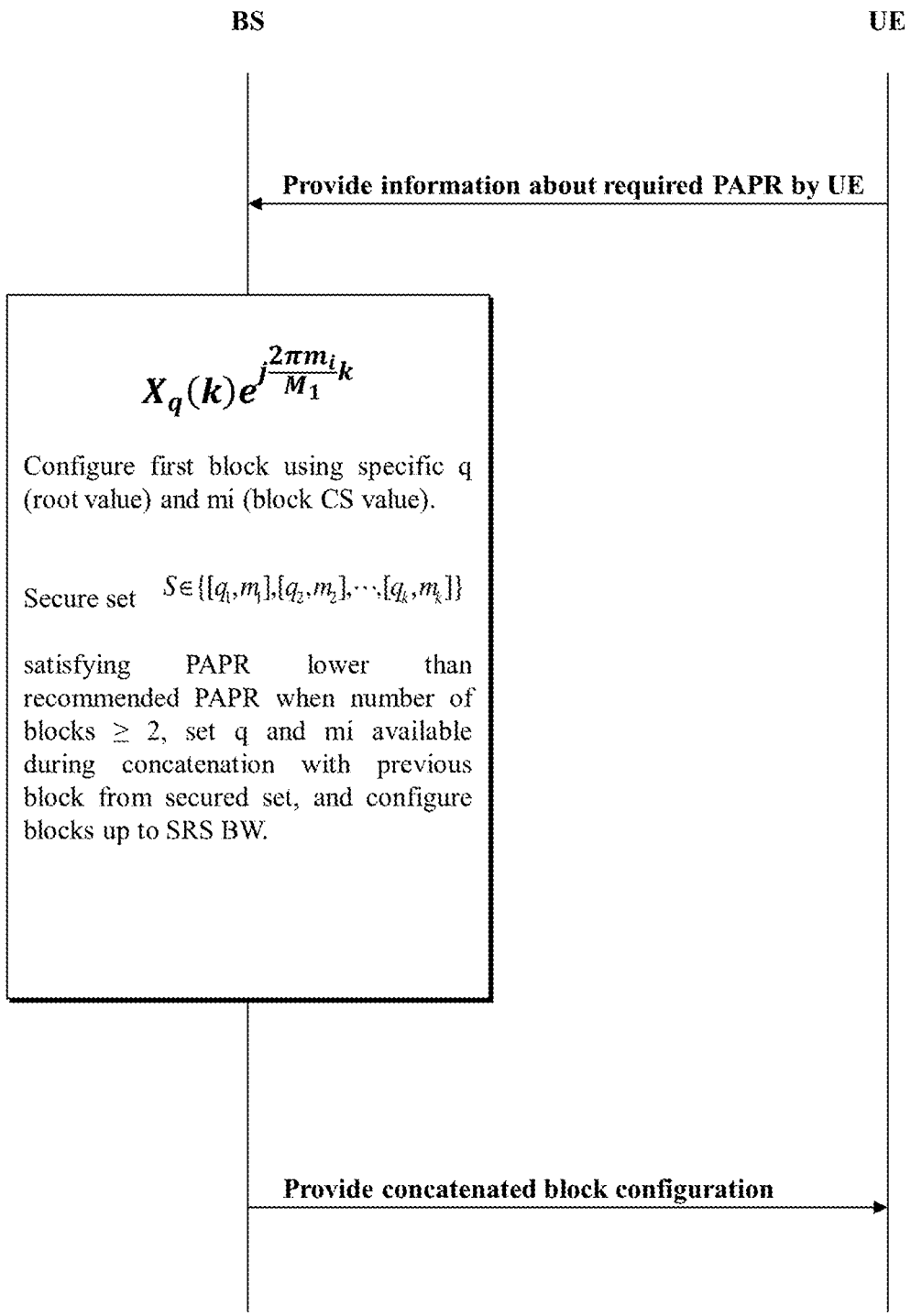
FIG. 16 is a diagram illustrating a procedure of configuring a low-correlation parameter for a low PAPR in concatenated block SRS configuration.

FIG. 16 is a diagram illustrating a procedure of configuring a low-correlation parameter for a low PAPR in concatenated block SRS configuration.

Referring to FIG. 16, the UE transmits information about the PAPR requirements to the BS as described above. The BS configures the first block using specific q (a root value) and mi (a block CS value)

$$\left(X_q(k)e^{j\frac{2\pi m_i}{M_1}k}\right)$$

so as to satisfy the required PAPR reported by the UE. If the number of blocks is 2 or more, the BS secures a set $S \in \{[q_1,m_1], [q_2,m_2], \ldots, [q_k,m_k]\}$ satisfying a PAPR lower than a recommended or required PAPR, sets q (the root value) and mi (the block CS value) which are available during concatenation with a previous block from the secured set, and configures blocks up to an SRS BW. Next, the BS may transmit concatenated block configuration information for SRS transmission to the UE.

Figure 17:
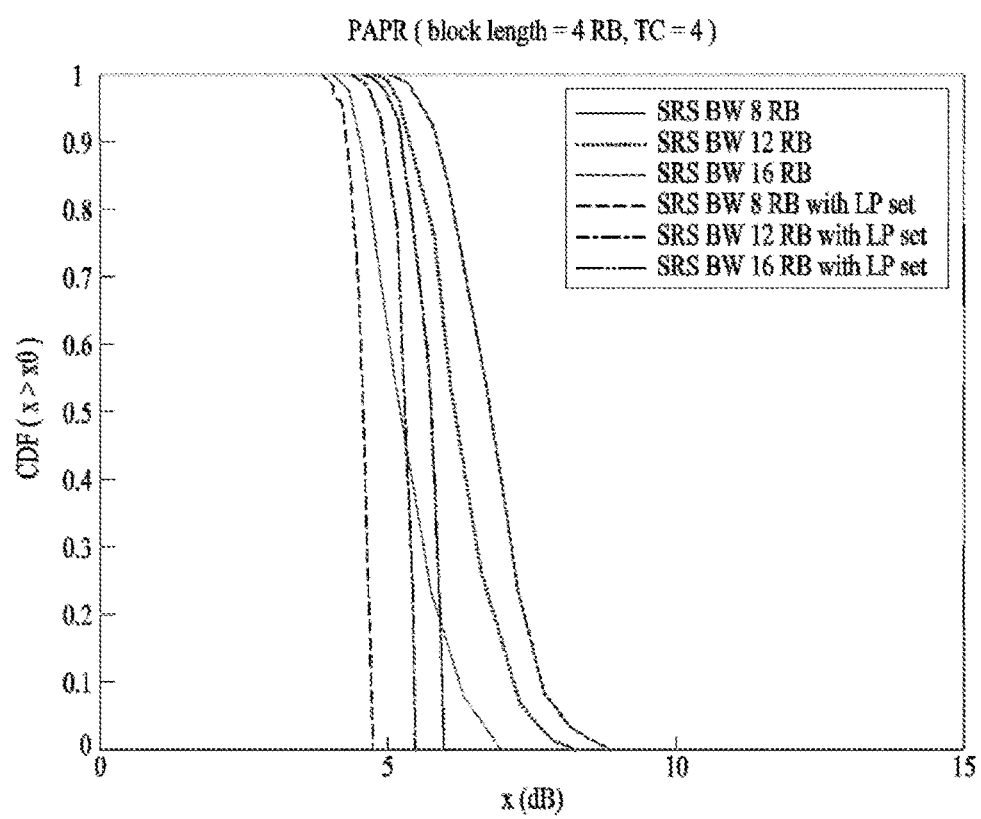
FIG. 17 is a diagram illustrating selection in a subset (in a ZC sequence and IFFT=2048) satisfying a PAPR lower than a target PAPR (4.8 dB for two blocks, 5.5 dB for three blocks, and 6.0 dB for four blocks).

FIG. 17 is a diagram illustrating selection in a subset (in a ZC sequence and IFFT=2048) satisfying a PAPR lower than a target PAPR (4.8 dB for two blocks, 5.5 dB for three blocks, and 6.0 dB for four blocks).

In FIG. 17, a target PAPR for selecting low-correlation parameters (LPs) in the second block when an SRS BW is 8 RBs is set to 4.8 dB, a target PAPR for selecting LPs in the third block when an SRS BW is 12 RBs is set to 5.5 dB, and a target PAPR for selecting LPs in the fourth block when an SRS BW is 16 RBs is set to 6 dB. Although selectable subsets are reduced (in the example, the number of subsets satisfying a required PAPR of 4.8 dB is reduced to 17 from 132. A target PAPR may increase to provide 30 low correlations), a PAPR required by the UE may be satisfied and simultaneously SRS utilization may be improved using a concatenated block.

Proposal 3-1

The BS may provide these subsets to the UE through RRC signaling or the MAC CE and provide an index indicating a set of low-correlation parameters through the DCI to the UE, thereby reducing overhead.

An embodiment of Table 11 below illustrates an index transmitted through the DCI when a low-PAPR subset is provided.

TABLE 11

| $S_2 = \{[q_1\ m_2], [q_3\ m_4], [q_7\ m_3]\}$ | $[q_1\ m_2]$ | $[q_3\ m_4]$ | $[q_7\ m_3]$ |
| --- | --- | --- | --- |
| Index for low correlation parameters | 0 | 1 | 2 |

Proposal 3-2

The BS may provide the UE with a parameter pattern (e.g., $A_3=\{S_1,S_2,S_3\}$ where $A_3$ may denote a subset having three blocks and $S_1,S_2,S_3$ may denote parameter subsets in the first, second, and third blocks, respectively) for a low correlation based on the number of blocks corresponding to an SRS BW through RRC signaling and a corresponding parameter index in a parameter subset for each block through the DCI.

Proposal 3-3

The BS may provide information about a parameter pattern set (e.g., $\Psi=\{A_3,B_3,C_3,D_3\}$ (where $A_3$, $B_3$, $C_3$, and $D_3$ are selected parameter patterns and parameter pattern sets may be distinguished by 2 bits) to the UE through RRC signaling and transmits a pattern having designated parameters through the DCI or the MAC CE.

As an embodiment, a parameter pattern set for a low correlation for a specific UE may be as listed in Table 12.

TABLE 12

|  | Number of blocks = 3 | | | |
| --- | --- | --- | --- | --- |
|  | $A_3 = \{S_{a1}, S_{a2}, S_{a3}\}$ | $B_3 = \{S_{b1}, S_{b2}, S_{b3}\}$ | $C_3 = \{S_{c1}, S_{c2}, S_{c3}\}$ | $D_3 = \{S_{d1}, S_{d2}, S_{d3}\}$ |
| Index for low correlation pattern group | 0 | 1 | 2 | 3 |

If a parameter pattern configured for a specific UE is $A_3$, the BS may indicate $A_3$ to the specific UE by transmitting '00' through the DCI. The BS may also transmit an index of a parameter subset value corresponding to $A_3$ through the DCI.

Proposal 4

The BS may configure a combination for arrangement of parameters (e.g., a root index, a block CS index, a TC, and a TC offset) for orthogonality or a low correlation of each block satisfying a PAPR lower than a required PAPR. For example, in an SRS consisting of two blocks [$S_1$, $S_2$], among a set $S_1=\{[q_1\ m_1\ l_1\ k_1], [q_1\ m_1\ l_1\ k_2], \ldots, [q_N\ m_M\ l_L\ k_K]\}$ of combinations of N roots, M block CSs, L TCs, and K TC offsets in the first block and $S_2=\{[q_1\ m_1\ l_1\ k_1], [q_1\ m_1\ l_1\ k_2], \ldots, [q_N\ m_M\ l_L\ k_K]\}$, if a combination satisfying a PAPR lower than specific PAPR0, i.e., the first block is selected as $S_1=\{[q_1\ m_1\ l_1\ k_1]\}$, the second block may be selected from among $S_2=\{[q_1\ m_2\ l_1\ k_2], [q_3\ m_4\ l_2\ k_2], [q_7\ m_3\ l_5\ k_6]\}$ when a parameter subset satisfying a PAPR lower than PAPR0 is $S_2=\{[q_1\ m_2\ l_1\ k_2], [q_3\ m_4\ l_2\ k_2], [q_7\ m_3\ l_5\ k_6]\}$.

Combinations of subsets (e.g., a root in a block, a TC in a block, a TC offset in a block, and the like) may be selected to satisfy a PAPR lower than the required PAPR from among the root in one block, the CS in one block, the TC in one block, and the TC offset in one block. The BS may configure a combination of parameters satisfying a PAPR lower than the required PAPR in consideration of PAPR capability reported by the UE and SRS sequence allocation capacity demanded in a system (e.g., the number $\Omega$ of SRS sequences which is maximally mappable in an allocated system resource) and configure the combination for each UE.

Figure 18:
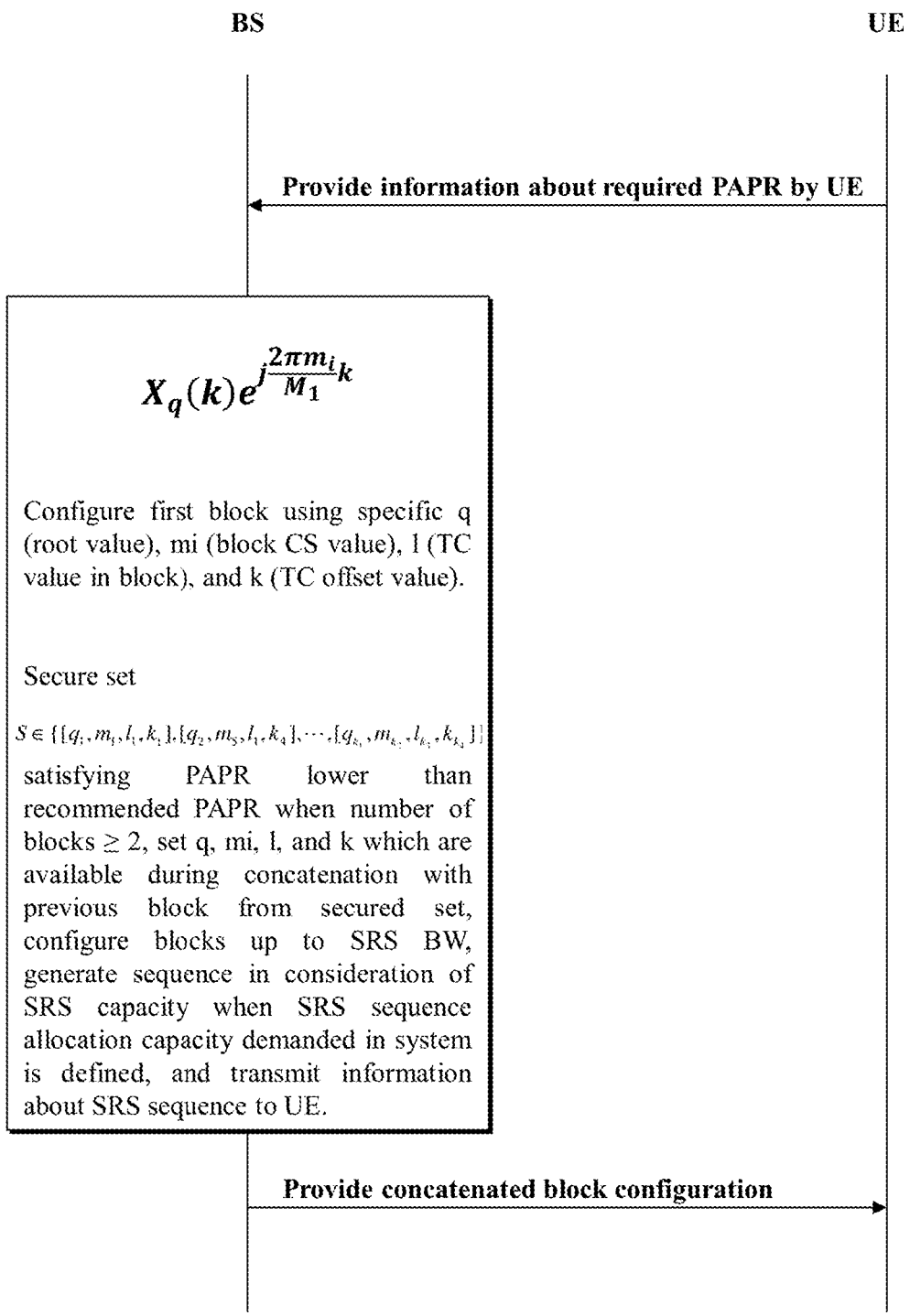
FIG. 18 is a diagram illustrating a low-correlation parameter setting order for a low PAPR (in consideration of PAPR capability reporting and SRS sequence allocation capacity demanded in a system) in concatenated block SRS configuration.

FIG. 18 is a diagram illustrating a low-correlation parameter setting order for a low PAPR (in consideration of PAPR capability reporting and SRS sequence allocation capacity demanded in a system) in concatenated block SRS configuration.

Referring to FIG. 18, the UE transmits information about the PAPR requirements to the BS as described above. The BS configures the first block using specific q (root value), l (TC value in a block), and k (TC offset value)

$$\left(X_q(k)e^{j\frac{2\pi m_i}{M_1}k}\right)$$

so as to satisfy a required PAPR reported by the UE. When the number of blocks is 2 or more, the BS secures a set $S \in |[q_1,m_1,l_1,k_1], [q_2,m_5,l_1,k_4], \ldots, [q_{k_1},m_{k_2},l_{k_3},k_{k_4}]$ satisfying a PAPR lower than a recommended or required PAPR and sets q (root value), mi (block CS value), l (TC value in a block), and k (TC offset value) which are available during concatenation with a previous block from the secured set. If SRS sequence allocation capacity demanded in a system is defined, the BS may generate an SRS sequence in consideration of the SRS capacity and transmit information about the SRS sequence to the UE.

As described above, technology has been proposed of properly limiting the number of blocks according to an SRS BW in order to prevent excessive increases in PAPR when a concatenated block SRS is configured for UEs for SRS utilization improvement of NR or restricting the SRS BW by limiting the number of blocks when one block is configured. In addition, technology of configuring subsets of low-correlation parameters in order to achieve a target PAPR and providing one of the subsets by the BS to the UE has also been proposed.

When a BW dependent SRS (LTE scheme) and a frequency position dependent SRS coexist in a network, the BS may configure, for cell-edge UEs, an SRS using a BW dependent SRS configuration method having a low PAPR due to restriction of transmission power and configure, for cell-centered UEs, a concatenated block SRS for flexible resource utilization. In this case, an SRS may be configured by basically limiting the number of blocks according to SRS BW in order to lower a high PAPR and instead increasing the length of a sequence mapped to one block.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method of receiving control information for SRS transmission in a wireless communication system and a UE therefor are industrially applicable to various wireless communication system such as a 3GPP LTE/LTE-A system and a 5G communication system.

The invention claimed is:

1. A method of receiving control information for sounding reference symbol (SRS) transmission by a user equipment (UE) in a wireless communication system, the method comprising:
transmitting, to a base station (BS), information including a peak-to-average power ratio (PAPR) capability, related to the SRS transmission, of the UE;
receiving, from the BS, control information including at least one of a SRS bandwidth (BW), a number of SRS blocks, or a length of one SRS block, configured for the UE; and
transmitting an SRS based on the control information,
wherein the at least one of the SRS BW, the number of SRS blocks, or the length of one SRS block is configured, by the BS, based on the information including the PAPR capability of the UE.

2. The method of claim 1,
wherein the information including the PAPR capability, which is transmitted by the UE, includes at least one of a size of required SRS BW, a number of required SRS blocks, or a length of required one SRS block.

3. The method of claim 1,
wherein the information including the PAPR capability, which is transmitted by the UE, includes at least one of a maximum number of supportable SRS blocks, a length of sequence per supportable SRS block, or a length of one supportable block.

4. The method of claim 1, wherein the information including the PAPR capability is transmitted in message 3 (MSG3) in a random access channel (RACH) procedure.

5. The method of claim 1, wherein the control information further includes information about an SRS parameter value to be applied to each SRS block corresponding to the number of the SRS blocks.

6. The method of claim 5, wherein the information about the SRS parameter value includes at least one of a root index, a cyclic shift (CS) index, a transmission comb (TC), or a TC offset value.

7. The method of claim 5, wherein the SRS parameter value is further configured to satisfy a PAPR of the SRS transmission lower than a required PAPR corresponding to the PAPR capability.

8. The method of claim 1, wherein the at least one of the SRS BW, the number of SRS blocks, or the length of one SRS block is configured to satisfy a PAPR of the SRS transmission lower than a required PAPR corresponding to the PAPR capability.

9. The method of claim 1, wherein the control information is received through downlink control information (DCI), a medium access control (MAC) control element (CE), or radio resource control (RRC) signaling.

10. The method of claim 1, wherein the at least one of the SRS BW, the number of SRS blocks, or the length of one SRS block is configured in further consideration of SRS sequence allocation capacity demanded in a system.

11. The method of claim 1, wherein a unit of the SRS block is a resource block (RB) or a resource element (RE).

12. The method of claim 1, wherein the SRS is transmitted on concatenated SRS blocks consisting of SRS blocks corresponding to the number of the SRS blocks.

13. A user equipment (UE) for receiving control information for sounding reference symbol (SRS) transmission in a wireless communication system, the UE comprising:
a transmitter;
a receiver; and
a processor,
wherein the processor controls the transmitter to transmit, to a base station (BS), information including a peak-to-average power ratio (PAPR) capability, related to the SRS transmission, of the UE controls the receiver to receive, from the BS, control information including at least one of an SRS bandwidth (BW), a number of SRS blocks, or a length of one SRS block, configured for the UE, and controls the transmitter to transmit an SRS based on the control information,
wherein the at least one of the SRS BW, the number of SRS blocks, or the length of one SRS block is configured, by the BS, based on the information including the PAPR capability of the UE.

14. The UE of claim 13, wherein the control information further includes information about an SRS parameter value to be applied to the SRS block.

15. The UE of claim 14, wherein the processor controls the transmitter to transmit the SRS by applying the SRS parameter value to each SRS block corresponding to the number of the SRS blocks.

16. The UE of claim 13,
wherein
the at least one of the SRS BW, the number of SRS blocks, or the length of one SRS block is configured to satisfy a PAPR of the SRS transmission lower than a required PAPR corresponding to the PAPR capability.

17. The UE of claim 13, wherein the processor controls the transmitter to transmit the SRS on concatenated SRS blocks consisting of SRS blocks corresponding to the number of the SRS blocks.

* * * * *